(12) United States Patent
Oue et al.

(10) Patent No.: US 7,342,556 B2
(45) Date of Patent: Mar. 11, 2008

(54) DISPLAY DEVICE AND METHOD OF MANUFACTURING SAME

(75) Inventors: Toshiyasu Oue, Nara (JP); Hiroyuki Yamakita, Osaka (JP); Mariko Kawaguri, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 536 days.

(21) Appl. No.: 10/722,594

(22) Filed: Nov. 28, 2003

(65) Prior Publication Data

US 2004/0145696 A1  Jul. 29, 2004

(30) Foreign Application Priority Data

Nov. 28, 2002 (JP) .............................. 2002-345679
Feb. 7, 2003 (JP) .............................. 2003-031220

(51) Int. Cl.
G09G 3/04 (2006.01)

(52) U.S. Cl. ...................... 345/33; 345/106; 345/107; 345/205

(58) Field of Classification Search ............. 345/33, 345/106, 107, 205
See application file for complete search history.

(56) References Cited

U.S. PATENT DOCUMENTS 6,329,623 B1 * 12/2001 Yan et al. ................. 209/129
6,373,461 B1 * 4/2002 Hasegawa et al. .......... 345/107
6,753,844 B2 * 6/2004 Machida et al. ............ 345/107
6,816,146 B2 * 11/2004 Harada et al. .............. 345/107
6,831,769 B2 * 12/2004 Holman et al. ............. 359/296
6,836,304 B2 * 12/2004 Sakamaki et al. .......... 349/106

FOREIGN PATENT DOCUMENTS

| JP | 3-53224 | 3/1991 |
| JP | P2001-312225 A | 11/2001 |
| JP | P2002-131789 A | 2/2002 |
| JP | P2002-174828 A | 6/2002 |

* cited by examiner

*Primary Examiner*—Richard Hjerpe
*Assistant Examiner*—Leonid Shapiro
(74) *Attorney, Agent, or Firm*—McDermott Will & Emery LLP

(57) ABSTRACT

A lower substrate including a first electrode and an upper substrate including a second electrode are opposed to each other. Partitioned spaces between the two substrates correspond to pixels, each including negatively charged black particles and positively charged white particles. In the lower substrate, a piezoelectric material is sandwiched between a third electrode and the first electrode, thereby forming a vibration-generating portion. In a display operation, a signal voltage corresponding to an image signal is applied between the first and second electrodes, and thus, the black particles and the white particles travel between the electrodes and adhere to the respective electrode surfaces to perform the display operation. Before rewriting the display, a sine wave voltage is applied between the first electrode and the third electrode to cause the vibration-generating portion to generate vibration. Aggregated particles are dissociated, and particles adhering to the electrode are detached, by the vibration.

39 Claims, 12 Drawing Sheets

DISPLAY DEVICE AND METHOD OF MANUFACTURING SAME

FIELD OF THE INVENTION

The present invention relates to display devices that can be written and rewritten repeatedly and that are furnished with a display element that performs display operations by causing a plurality of colored particles to travel between a pair of opposing substrates by an electric field. The invention also relates to methods of manufacturing such devices.

BACKGROUND OF THE INVENTION

Conventionally, twisted nematic liquid crystal (hereafter referred to as "TN liquid crystal") display elements and organic electroluminescence (hereafter referred to as "organic EL") elements have been known to be thin, low power display elements that can be used in personal digital assistants. In TN liquid crystal display elements, the alignment state of liquid crystal molecules in the liquid crystal layer changes only during the period in which a voltage is applied, by which the transmissivity of light that transmits through the liquid crystal layer is controlled to perform a display operation. For this reason, operating power is constantly required for the display operation, and images cannot be displayed in a non-powered state. Likewise, organic EL elements utilize light emission caused in a state where electric current or voltage is applied to display images, and therefore, the image display is impossible in a non-powered state, as with the TN liquid crystal display elements.

In contrast, a display element has been proposed to date that has such a characteristic that it requires voltage or current only when rewriting display images, and an display image that has been written once can be retained until the image is rewritten even under a non-powered state. Since such an element, unlike the TN liquid crystal display elements or the organic EL elements, does not require electric power for retaining images, the use of such a display element for, for example, a display unit in personal digital assistants can achieve considerable reduction in the power consumption and reduction in the device size. In addition, by adopting a configuration in which the rewriting device is detachable from the display element, namely a display panel, it is possible to realize a small thickness, light-weight display element that does not require a driver circuit and has flexibility. Such an element is advantageous for portable devices.

Display systems in these elements can be broadly categorized into a system using micro-particles, a system utilizing an electrochemical or photochemical reaction of a solution or the like, and a reflected light controlling system using an electromechanical effect.

For one example of the element using the display system using micro-particles, a research has been made on a display element that performs a display operation by applying an electric field to a system in which charged colored microparticles are dispersed in a colored solution filled between a pair of substrates provided with a pair of electrodes so that the particles travel (electrophoretic phenomenon) in the solution. One example of such a display element has a configuration in which a two-color display is performed by, of two kinds of particles, causing the particles having a negative polarity to travel to the positive electrode side and causing the particles having a positive polarity to travel to the negative electrode side. Another example of that configuration is such that colored particles in a colored solution are caused to travel according to their polarities so that when the particles travel to an observer side, the color of the particles are observed, whereas when the particles travel to the far side from the observer, the color of the colored solution is observed. Further another conceivable example of that configuration is such that a multi-color display is performed using two or more kinds of colored particles and colored solutions.

In addition, another example of the use of the foregoing electrophoresis principle is a technique in which electrodes are formed in the same surface of a substrate and a multi-color display is achieved by using a state where particles are gathered on the electrodes and a state where the particles are dispersed over the surface. For example, there is a display system in which a narrow-width, fine-wire electrode and a wide-width, plate-shaped electrode are formed on a surface of one of transparent substrates, and a multi-color display is achieved by controlling a state in which charged particles are gathered by adhering them to the fine-wire electrode and a state in which the charged particles are dispersed by adhering them to the plate-shaped electrode. Also, there is a display system called a twist ball system in which a multi-color display is achieved by rotating spherical or cylindrical particles that are colored in at least two colors by an electric field.

In the display element that performs display by causing the particles to travel in a solution, the traveling velocity of the particles is affected by the viscosity of the solution. Specifically, when the particles travel in a solution having a large viscosity, their traveling velocity becomes slow, and the display speed (response speed) of the element is accordingly slow. In addition, since there is no threshold value of the voltage at which the particles start to travel, an active matrix drive is necessary for the drive circuit. This increases cost.

In view of this, a system has been proposed in which particles are caused to travel in a gas phase, in which the traveling velocity of the particles is faster than in a solution. This system is such that at least one kind of charged colored particles are dispersed in a gas phase, and the particles are caused to travel between electrodes having opposite polarities by the Coulomb force of the electric field applied to the gas phase. In a gas phase, the traveling velocity of particles is fast because there is no such viscous drag of the traveling medium as in the liquid phase. As a result, the display speed becomes faster, and high-speed response is possible. Among such systems in which particles are caused to travel in a gas phase, there are a system having a configuration in which, using charged conductive toner particles and non-charged insulative particles, the charged particles are caused to travel by a Coulomb force (for example, see Japanese Unexamined Patent Publication No. 2000-347483), and a system having a configuration in which two kinds of particles having different polarities are caused to travel by a Coulomb force (for example, see Japanese Unexamined Patent Publication No. 2001-312225).

The display element that performs a display operation by causing particles to travel in a liquid phase or in a gas phase as described above requires a gap serving as the traveling space for the particles. The gap such as this is formed by supporting a pair of substrates opposed to each other by a spacer, which serves as a gap-retaining member.

FIG. 17 is a schematic view showing the configuration of such a display element. As shown in FIG. 17, in the display element, a substrate 51 and a substrate 52, on the inner surfaces of which an electrode 53 and an electrode 54 are formed, are supported by a spacer 56 and are opposed to each other, whereby a gap 55 is formed. In this gap 55, a plurality of negatively charged black particles 57 and a plurality of positively charged white particles 58 are contained, and the gap 55 serves as a traveling space 55' for the colored particles. The traveling space 55' is in a liquid phase or in a gas phase depending on the display system. In such a configuration, the traveling space 55' for the colored particles is partitioned by the spacer 56, and accordingly, the spacer 56 serve as a partition wall in the space (hereafter, the spacer 56 is referred to as "partition wall 56'").

Here, in the traveling space 55', there occurs a phenomenon in which when the colored particles 57 and 58 having different polarities travel in the space toward respective electrodes 53 and 54 according to their polarities, the particles aggregate to one another since the particles having different polarities come into contact with one another a number of times. This causes luminance unevenness in each pixel of the display element. In a rewritable display element, the number of times the particles come into contact one another increases according to the number of rewriting operations since rewriting of the display is performed over and over again. Consequently, such an aggregation phenomenon becomes a cause of display image quality degradation. In particular, it is known that the traveling of particles in a gas phase is restrained mainly due to the contacting between particles having different charging characteristics. Therefore, the aggregation phenomenon occurs and the display image quality degrades when the flowability between particles having different charging characteristics is low.

Moreover, in the traveling space 55' partitioned by the partition wall 56', particles adhere to the partition wall surface or aggregate in the vicinity of the partition wall due to a force such as an image force. For this reason, luminance unevenness is observed in the partition wall vicinity. In addition, when the black particles 57 and the white particles 58 are contained and dispersed in the traveling space 55' partitioned by the partition wall 56', aggregation occurs between particles having different polarities due to an electrostatic force or between particles due to van der Waals force; therefore, dispersion of the particles becomes non-uniform, and uneveness is observed. Such dispersion uneveness of the particles causes luminance unevenness to occur.

Meanwhile, in view of the above-described problem, various techniques have been proposed for crushing the aggregated group of particles and dissociate them into individual particles. Among them, one effective technique is such that the vibration of ultrasonic wave or the like is used to dissociate aggregated particles. For example, a display element has been disclosed in which a vibration-imparting means is disposed at the reverse surface side (that is, the far side from the traveling space for particles) of a substrate (see, for example, Japanese Unexamined Patent Publication Nos. 2002-131789, H3-53224, and 2002-174828). The vibration-imparting means may have a configuration for imparting vibration to the display element itself, or a configuration for vibrating particles by an electric field or the like.

Nevertheless, the configuration of providing the vibration-imparting means for the display element separately is unfavorable in terms of cost. Further, for example, when the rigidity of the substrate is higher, the vibration generated by the vibration-imparting means is transmitted more from the substrate to the particles in the traveling space, and accordingly, as the rigidity increases, the amplitude of vibration must be increased accordingly. For this reason, the size of the vibration-imparting means also needs to be large, which requires a housing structure for preventing reduction in the vibrational energy from the vibration-imparting means. This increases the cost of the display element.

Moreover, the configuration in which a vibration-imparting means is provided requires a voltage to be applied to the vibration-imparting means for generating vibrations in addition to the image signal voltage applied for rewriting display images. Here, when the particles are caused to travel according to their polarities between the electrodes having opposite polarities, the particles cannot be detached and caused to travel from one of the electrodes to the other electrode unless the Coulomb force of the electric field generated by the application of an image signal voltage is greater than the adhesive force (specifically, the van der Waals force and the image force) between the one of the electrodes and the particles adhering thereto; therefore, a very high operating voltage is required to rewrite display images. Consequently, the display element that requires an operating voltage for the vibration-imparting means necessitates further higher operating voltages, and if the applied voltage is low, luminance unevenness occurs as well as contrast degradation.

SUMMARY OF THE INVENTION

In view of the foregoing and other problems, it is an object of the present invention to provide a display device and a method of manufacturing such a device that achieve good display by preventing luminance unevenness and contrast reduction and attain reduction in the operating voltage.

In order to solve the foregoing and other problems, the present invention provides a display device, including a pair of substrates opposed to each other and provided with electrodes, at least one of the substrates is light-transmissive and at least one surface of the substrates is provided a electrode, a spacer disposed between the substrates for retaining a space having a desired width, and at least one kind of group of electrostatic particles contained in the space between the substrates, the device being configured to display an image corresponding to an image signal voltage applied to the electrodes of the substrates by causing the group of particles to travel in the space between the substrates by an electric field produced by the image signal voltage, comprising: a particle utilization-promoting means for preventing the number of particles contributing to the display from decreasing, the particle utilization-promoting means provided so as to face the space in which the group of particles travel.

For example, the display device according to an embodiment of the invention may be such a display device including a pair of substrates opposed to each other and provided with electrodes, and at least one of the substrates is light-transmissive and at least one surface of the substrates is provided an electrode, a spacer disposed between the substrates for retaining a space having a desired width, and at least one kind of group of electrostatic particles contained in the space between the substrates, the device being configured to display an image corresponding to an image signal voltage applied to the electrodes of the substrates by causing the group of particles to travel in the space between the substrates by an electric field produced by the image signal voltage, comprising: a vibration-generating portion provided so as to face the space in which the group of particles travel.

Generally, dispersing of aggregated micro-particles is carried out by dispersing using airflow, collision to obstruction, or mechanical crushing. Among them, mechanical crushing is most suitable for display devices in which the display operation is performed using particles. Mechanical crushing can be realized by, for example, imparting vibration to aggregated groups of particles. Specifically, when imparting high frequency vibrations to aggregated groups of particles, the vibrational energy is transmitted to the particles and received by the particles, and as a result, the aggregated particles are dissociated and dispersed.

In the configuration of an embodiment of the invention, the vibration-generating portion is provided on the side facing the space formed between the pair of substrates supported by the spacer, and therefore, vibrations can be imparted to the group of particles more directly and effectively than in the configuration in which the vibration-generating portion is formed outside the substrates, that is, on opposite to the space. Consequently, it becomes possible to improve the effect of dispersing particles. Thus, according to the configuration of an embodiment of the invention, even if the aggregation occurs at different scales among the pixels, the aggregation can be broken by generating vibration by the vibration-generating portion and imparting the vibration to the aggregated groups of particles, thus the occurrence of luminance unevenness and degradation of contrast are improved.

Moreover, since the particles that have adhered to the substrates can be detached therefrom by vibration, it becomes possible to erase display images by the vibration even without applying a voltage between electrodes for causing the particles to travel. Furthermore, the detached groups of particles can be utilized for the display operation effectively, and consequently, improvement in luminance unevenness and increase in contrast can be achieved.

Still further, in such a configuration, because the dissociation of aggregated groups of particles and the detachment of adhering particles are carried out by vibration, the voltage required for the dissociation and the detachment is reduced in the image display operation. Therefore, the applied voltage for the particle traveling can be reduced, which leads to reduction in power consumption of the display device.

In addition, the amount in electrostatic charge of particles that reduces over time can be recovered through the friction or the like by imparting vibration. Therefore, the amount of electrostatic charge in the particles can be maintained to be constant, and consequently, stable and good display operations can be performed.

Either a first electrode and a second electrode to which the image signal voltage is applied may be formed on one of the substrates, or the first electrode may be formed on one of the pair of substrates and the second electrode may be formed on the other one of the pair of substrates.

In the configuration in which the first and second electrodes are formed on one of the substrates, a transverse electric field is applied to the vibration of the vibration-generating portion, and therefore, the vibration strength can be intensified.

The vibration-generating portion may include electrodes and a vibration generator that generates vibration by an electric field formed by the electrodes, and at least one of the electrodes may constitute the electrode provided on the substrate, specifically, at least one of the first and the second electrodes.

Such a configuration can suppress cost and also achieve thickness reduction and thickness reduction of the display device. Furthermore, if the configuration is such that the vibration-generating portion generates vibration by an electric field applied between the first and second electrodes with an appropriate frequency and strength, further cost reduction as well as thickness reduction and weight reduction of the device can be achieved because the image display operation and the vibration generation can be carried out using a common electrode.

The vibration-generating portion may include electrodes and a vibration generator that generates vibration by an electric field formed by the electrode, and the vibration-generating portion may constitute the spacer.

Here, in a display device in which the traveling of particles is carried out by an electric field, a partition wall is generally provided for each pixel to prevent luminance unevenness due to the difference of the density of the particles in the display region. In the display device according to an embodiment of the invention, the spacer is thus utilized as the partition wall, and the partition wall is also utilized as the vibration-generating portion. Specifically, the configuration may be such that a third electrode is provided in the vicinity of the partition wall composed mainly of the vibration generator, for example, on its side surface, and the vibration-generating portion generates vibration by applying a voltage between the third electrodes of adjacent pixels. Alternatively, the configuration may be such that third electrodes are provided at respective longitudinal ends of the vibration generator, and the vibration-generating portion generates vibration by applying a voltage between the third electrodes. In these configurations, an insulative medium is disposed between the third electrode and the first and second electrodes to insulate them.

The space in which the group of particles travel may be a gas phase space.

In such a configuration, since the group of particles travel in a gas phase, the traveling velocity of the particles is not affected by the viscosity of the solution, unlike the case where the group of particles travel in a liquid phase. Therefore, the traveling velocity of the particles improves in comparison with the case where the particles travel in a liquid phase. Consequently, it becomes possible to improve the response speed of the display device. Moreover, in the configuration in which the particles travel in a gas phase space, the threshold voltage for causing the particles to travel is higher than in the case where they travel in a liquid phase space. For this reason, the particles can be prevented from traveling due to crosstalk voltages or the like. Therefore, a passive matrix drive type display can be easily realized, which has been difficult to realize with the configuration in which the particles travel in a liquid phase space due to the problem of crosstalk voltages.

The space in which the group of particles travel may be a liquid phase space filled with an insulative solvent.

In an insulative solvent, the particles disperse relatively easily, but if the particle diameter of the particles becomes microscopically small, the probability that the particles come into contact with one another increases with traveling between the electrodes repeatedly. Meanwhile, as the particle diameter of the particles becomes smaller, the intermolecular force (van der Waals force), which is an adsorbing force between the particles, becomes relatively larger with respect to the dispersion force (for example, their electrostatic repulsion). For this reason, the display devices in which the particle size is made microscopically small for increasing resolution are particularly likely to cause aggregation of the particles, easily causing the occurrence of luminance unevenness and contrast degradation.

In view of this, in an embodiment of the invention, the dissociation of aggregated particles and the detachment of the particles adhering to the substrates are carried out by imparting the vibration generated by the vibration-generating portion to the particles in the insulative medium. This makes it possible to prevent the occurrence of luminance unevenness and the degradation of contrast.

Capsules each containing the group of particles and the insulative solvent, may be disposed in the space between the substrates. In such a configuration, since the group of particles are contained in the capsules, the group of particles travel within a limited traveling space. Consequently, it is possible to realize a structure in which the density of particles is invariable in the display region.

The particles composing the group of particles may be aligned by an electric field applied between the electrodes of the substrates according to the image signal voltage. For example, the group of particles may be electric field-aligned particles aligning along the electric field.

The particles having a dielectric constant causes polarization to occur in the particles along the electric-field vector. This polarization acts on adjacent particles as a kind of attractive force and causes the particles to be aligned, thus performing a display operation. In the particles aligned by the electric field, the polarization is retailed due to the interaction between the particles even after the electric field has been removed, and therefore, the display image is retained without applying a voltage. Meanwhile, upon generating vibration by the vibration-generating portion, the vibration is imparted to the aligned particles. Then, when the vibrational energy becomes greater than the retention energy (that is, the interaction force between the particles), the alignment of the particles is broken and the particles are dispersed in the space uniformly. Thus, an image is erased.

Generally, insulators usually have a dielectric constant. Accordingly, in particles composed of an insulator, it is determined whether the particles travel in the space according to the electrostatic charge or they align in the space according to the polarization, depending on the relative relationship the Coulomb force due to the electrostatic charge of the particles and the Coulomb force due to the polarization. In the former case, the particles travel toward the electrode having the opposite polarity to the charge polarity of the particles, whereas in the latter case, the particles align according to the distribution of the electric field. The embodiment of the invention can be adapted to a display device adopting particles that have a small amount of electrostatic charge and are aligned by an electric field.

The group of particles may be colored with at least one color. For example, if two different kinds of groups of particles having different electrical characteristics are used and the two kinds of groups of particles are subjected to respective different coloring treatments, at least two-color display is realized according to its driving method.

The vibration-generating portion may be composed of a piezoelectric material. Such a configuration makes it possible to generate vibration easily by producing piezoelectric effect by applying a voltage to the piezoelectric material The vibration-generating portion may also serve as at least one of the substrates. If the vibration-generating portion made of polymer or like material is used, it becomes possible to use the vibration-generating portion itself as the substrate since the vibration-generating portion is given some strength. For example, the configuration may be such that a pair of vibration-generating portions are supported by a spacer so as to oppose each other, and at lease one kind of group of particles is contained in a space thus formed between the vibration-generating portions. Such a configuration attains thickness reduction and weight reduction of the image display device. Moreover, it is more advantageous than hard substrates such as glass, in terms of flexibility and flexural strength.

The display operation of the display device may include at least a first display state and a second display state; in the first display state, a first image signal voltage is applied to the electrodes provided on the substrates to form a first electric field; in the second display state, a second image signal voltage is applied to the electrodes provided on the substrates to form a second electric field having a different direction from that of the first electric field; and an application of a high-frequency sine wave voltage to the vibration-generating portion and an application of the image signal voltage to the electrodes provided on the substrates are carried out when performing rewriting from the first display state to the second display state.

Normally, in rewiring a display image, the particles are caused to travel by applying a rectangular voltage corresponding to an image signal voltage over the entire display element. With this voltage application, however, the particles adhering to the substrates or the aggregated particles cannot be detached or dissociated completely, and as a result, the display characteristics after the rewriting become degradable. Particularly in a display device configured such that the particles are dispersed in a gas phase, the area in which the particles come in contact with one another is large, and adherences between particles and between particles and substrates are great, which cannot be negligible. While, in a display device in which particles are dispersed in a liquid phase as well, the particles adhering to substrates and the aggregated particles bring about degradation in display characteristics. In view of this, in an embodiment of the invention, the application of a high-frequency sine wave voltage to the vibration-generating portion is performed in addition to the application of an image signal voltage, and with such a voltage application to the vibration-generating portion, mechanical vibration can be generated by the vibration-generating portion, and therefore, the dissociation of aggregated particles and the detachment of adhering particles can be carried out by utilizing this vibration.

The application of the high-frequency sine wave voltage and the application of the image signal voltage may be carried out simultaneously or in different timing. For example, to rewrite images, the foregoing voltage application is performed to the vibration-generating portion at first, and the detachment and dissociation of the particles are performed to erase an image by using the generated mechanical vibration. Thereafter, the image signal voltage is applied to cause the particles to travel toward a desired electrode side by a direct electric field, thus a display operation is performed. In such a rewrite operation, since an image is erased and the aggregation and the adherence of the particles are resolved by the vibration, the voltage required for the detachment and dissociation of the particles is unnecessary in applying an image signal voltage thereafter. Therefore, good display characteristics can be achieved with a lower operating voltage, and consequently, reduction in drive voltage for the display device is achieved.

The present invention also provides a display device for displaying an image corresponding to an image signal voltage applied between a pair of electrodes disposed in a space formed between a pair of opposed substrates, at least one of which is transparent, by causing at least one kind of plural charged colored particles internally existing in the space to travel between the electrodes by an electric field produced by the image signal voltage, comprising: a partition wall for partitioning the space into pixels; a substrate-side electrode connected to a voltage applying means and provided on an inner surface of the substrate for each of the pixels; and a partition wall-side electrode provided on the partition wall for each of the pixels and connected to the voltage applying means; wherein the image signal voltage is applied to at least the substrate-side electrode to perform a display operation.

In such a configuration, since the space is partitioned by the partition wall between adjacent pixels, the total amount of the colored particles internally existing in the pixel can be kept invariable at all times, and it is possible to prevent the colored particles from gathering in specific pixels. Accordingly, it becomes possible to prevent luminance unevenness in the display screen of the display device. It should be noted here that the phrase "the particles internally existing in the space" is intended to mean the state in which the particles are contained in a hermetically sealed space.

Also with such a configuration, an electric field generated by applying a voltage to the substrate-side electrode and an electric field generated by applying a voltage to the partition wall-side electrode can be obtained. For this reason, it becomes possible to control the traveling of the colored particles in the space by controlling the applied voltage to each of these electrodes and controlling the distribution of these electric fields. As a consequence, it becomes possible to perform good display operations in which luminance unevenness is suppressed, and reduction in the operating voltage is also achieved.

The foregoing space may be a gas phase space.

In such a configuration, because the colored particles travel in the gas phase, the traveling velocity of the particles is not affected by the viscosity of the solution, unlike the case where the particles travel in a liquid phase. Therefore, the traveling velocity of the particles improves in comparison with the case where the particles travel in the liquid phase. Consequently, it becomes possible to improve the response speed of the display device. Moreover, in the configuration in which the particles travel in the gas phase space, the threshold voltage for causing the particles to travel is higher than in the case where they travel in the liquid phase space. For this reason, the particles can be prevented from traveling due to crosstalk voltages or the like. Therefore, a passive matrix drive type display can be easily realized, which has been difficult to realize with the configuration in which the particles travel in a liquid phase space due to the problem of crosstalk voltages.

At least one of an electric field formed by applying a voltage to the substrate-side electrode and an electric field formed by applying a voltage to the partition wall-side electrode may be an alternating electric field.

With such a configuration, the traveling direction of the particles can be changed in the space by applying an alternating electric field. By changing the traveling direction of the particles, the display state can be changed to rewrite images.

The display device may be such that the substrate-side electrode includes a pair of electrodes disposed on at least one of the substrates; the substrate-side electrodes are connected to a first voltage applying means for applying the image signal voltage to the substrate-side electrodes; and the partition wall-side electrode is connected to a second voltage applying means for applying a voltage that forms an electric field for preventing the charged particles from adhering to the partition wall to the partition wall-side electrode. In a configuration in which the charged colored particles include two or more kinds of particles having different charging characteristics and internally existing in the space, the second voltage applying means applies a voltage to the partition wall-side electrode, the voltage forming an electric field for preventing adherence to the partition wall of particles whose color is observed among the charged colored particles from a viewing side and determines a display color Such a configuration makes it possible to remove the colored particles that have adhered to the partition wall due to image forces or the like by the use of the electric field formed by the voltage applied to the partition wall-side electrode, and to prevent the adherence of the colored particles to the partition wall, and aggregation/separation of the particles accompanying the adherence. For example, the particles that adhere to the partition wall surface due to image force, van der Waals force, or the like are repelled from the partition wall-side electrode and easily detached from the partition wall, since the partition wall-side electrode is made the opposite polarity to that of the particles by the electric field formed by the voltage applied to the partition wall-side. The detached particles travel between the substrate-side electrodes with the electric field formed by the voltage applied to the substrate-side electrodes, contributing to the display operation. Moreover, by preventing the particles from adhering to the partition wall, the aggregation and separation of the particles can be suppressed. Therefore, such configuration makes it possible to utilize the colored particles for the display operation effectively and thereby to attain reduction in luminance unevenness.

It is possible that the first voltage applying means applies the image signal voltage to the substrate-side electrode, and thereafter, the second voltage applying means applies the voltage to the partition wall-side electrode.

In such a configuration, at first, the colored particles travel in the space between the substrates by an electric field formed by the image signal voltage applied to the substrate-side electrode by the first voltage applying means. During this traveling, adherence of the particles to the partition wall takes place, but here, the second voltage applying means applies a voltage to the partition wall-side electrode after the voltage application to the substrate-side electrode; therefore, with the electric field formed by this voltage application to the partition wall-side electrode, the colored particles that have adhered to the partition wall can be removed.

It is possible that the image signal voltage application by the first voltage applying means to the substrate-side electrode and the voltage application by the second voltage application means to the partition wall-side electrode are performed simultaneously.

In such a configuration, the voltage application by the first voltage applying means and the voltage application by the second voltage applying means are carried out simultaneously, and consequently, the electric field for causing the colored particles to travel in the space between the substrates is generated simultaneously with the electric field for preventing the colored particles from adhering to the partition wall. As a consequence, it becomes possible to prevent the particles from adhering to the partition wall and yet to cause the particles to travel in the space between the substrates.

The first voltage applying means and the second voltage applying means may be configured including a common power supply or including different power supplies respectively.

In such a configuration, reduction in power consumption and space saving of the display device are possible, especially when the first voltage applying means and the second voltage applying means are constituted including a common power supply.

The partition wall-side electrode may be electrically connected to at least one of the substrate-side electrodes. For example, the first voltage applying means applies the image signal voltage to a first electrode and a second electrode, which are the pair of electrodes disposed on at least one of the substrates, to form an electric field directed toward the second electrode, the second voltage applying means applies a voltage to the partition wall-side electrode electrically connected to the first electrode to form an electric field directed toward the second electrode, and while the voltage is being applied to the second electrode, the voltage is applied to the partition wall-side electrode.

In such a configuration, an electric field can be generated by applying the same magnitude of voltage between one of the substrate-side electrodes and the partition wall-side electrode as the voltage applied between the pair of substrate-side electrodes, and adherence of the colored particles to the partition wall can be prevented with the use of this electric field. For example, the electric field produced by the image signal voltage applied between the first and the second electrodes provided on the substrates causes the particles to travel from the first electrode to the second electrode, whereby the particles adhere to the second electrode side. On the other hand, the electric field produced by the voltage applied between the partition wall-side electrode and the second electrode forces the particles that have adhered to the partition wall-side electrode to detach from the partition wall-side electrode according to their polarity, to travel toward the second electrode, and to adhere to its surface. Thus, such a configuration makes it possible to utilize the voltage applied between the substrate-side electrodes as the voltage applied between one of the the substrate-side electrode and the partition wall-side electrode by switching the voltage application path with a switching element or the like. Accordingly, while the applied voltage is kept constant, it is possible to cause the particles to travel between the substrate-side electrodes and to remove the particles from the partition wall, and it is also possible to cause the particles that are detached from the partition wall-side electrode to travel to the second electrode. Thus, such a configuration eliminates the need for applying the voltage for traveling of the particles and removing the particles separately, making it possible to reduce the operating voltage of the display device.

It is possible that the display device comprises of one kind of charged colored particles internally exist in the space, a colored layer exhibiting a different color from that of the particles and provided on the side of the substrate-side electrode or the partition wall-side electrode, and a voltage applying means provided for applying the image signal voltage between the substrate-side electrode and the partition wall-side electrode. Further, in such a configuration, it is possible that a display operation in each of the pixels in the display device includes at least a first display state and a second display state, the charged particles covers the surface of the colored layer provided on the substrate-side in the first display state, and the charged particles travel to the partition wall-side electrode to expose the surface of the colored layer in the second display state.

With such a configuration, the display operation according to the color of the charged particles is performed by covering the surface of the colored layer with the particles, whereas a display operation according to the color of the colored layer is performed by removing the particles from the surface of the colored layer and adhering to the partition wall-side electrode to expose the colored layer. Here, since the particles traveling in the space is only one kind, unlike the case of using a plurality of kinds of particles having different polarities, the particles do not interfere with each other in traveling, for example, without colliding with each other, and do not aggregate each other. Therefore, the particles can be caused to travel quickly and efficiently, and consequently, improvement in the display response speed and reduction in the operating voltage can be achieved.

At least one of a voltage applied to the partition wall-side electrode and a voltage applied to the substrate-side electrode may be configured by superimposing a DC voltage and a rectangular wave AC voltage smaller than the DC voltage.

In such a configuration, the particles that have adhered to the partition wall side or the substrate-side are caused to perform microscopically vibration motion by a rectangular wave AC voltage applied, and thereby the adhesive forces of the particles (specifically, the adhesive force between the particles and between the particles and the partition wall or the substrate) are weakened. Then, with the applied DC voltage, a Coulomb force greater than the weakened particles' adhesive forces is imparted to detach the particles from the object to which they adhere, causing the particles to travel toward the side of the opposite polarity to that of the particles. Thus, such a configuration makes it possible to weaken the adhesion forces of the particles by applying an AC voltage and therefore requires a lower DC voltage for causing the particles to travel than the case where only a DC voltage is applied. As a result, reduction in the operating voltage can be achieved.

The partition wall may also serve as the partition wall-side electrode.

Such a configuration eliminates the need for providing the partition wall and the partition wall-side electrode separately and therefore makes the manufacture easy and cost reduction possible.

The partition wall may partition the pixels into a hexagonal shape when viewed in plan.

Such a configuration improves the strength against the force applied from the front face (display screen) of the display device, and also makes it possible to arrange the pixels in a closely-packed configuration.

At least one kind of the charged colored particles may be porous particles.

Generally, adhesive forces between particles are represented by capillary force, van der Waals force, electrostatic force, and the like. Among them, capillary force can be prevented by producing a dry condition to some degree. On the other hand, van der Waals force between particles or between particles and the object to which they adhere, and electrostatic force between particles are determined by the characteristics of the particles themselves, and therefore, it is necessary to take the material characteristics of the particles into consideration.

For this reason, if porous particles are used as the particles, it is expected that the van der Waals force between the particles and between the particles and an object to which they adhere can be reduced because the molecular weight of each particle reduces. The reason is that the van der Waals force is obtained by integrating the attractive forces between the molecules regarding all the molecules that constitute the particle, and therefore, if porous particles are adopted as in this configuration, it is expected that the integral regarding the entire particle becomes smaller than that for ordinary particles. Then, if the van der Waals force can be reduced, the adhesive forces between the particles can be reduced. As a result, the traveling of the particles becomes easy, leading to reduction in the operating voltage, and it becomes possible to suppress adherence of the particles to the partition wall. Moreover, being lightweight, porous particles can delay the precipitation of the particles and therefore, they can realize a floating state in which the particles do not adhere completely to the object to which they adhere. In such a floating state, it is unnecessary to apply an electric field that produces a Coulomb force greater than the adhesive force to detach the particles from the object to which they adhere when the particles are caused to travel. Therefore, further reduction in the operating voltage as well as high-speed response is possible.

At least one kind of the particles may be composite particles composed of core particles and micro-particles having a diameter of about $1/1000$ to $1/100$ of the diameter of the core particles and fixed to the core particles in a manner to cover the surface of the core particles.

The van der Waals force attenuates as the distance between the particles and the distance between the particles and the object to which they adhere become greater, and it greatly attenuates inversely proportional to the square of the distances. Accordingly, by adopting the configuration in which micro-particles adhere to core particles, it is possible to increase the distance between the core particles, which are the primary component of the particles, and the distance between the core particles and the object to which the particles adhere. Therefore, it is expected that reduction in the van der Waals force will be achieved. Here, if the size of the micro-particles is too small, the distance between the core particles and the distance between the core particles and the object to which the particles adhere cannot be made large. On the other hand, if the size of the micro-particles is too large, the interaction between the micro-particles and the interaction between the micro-particles and the object to which they adhere increase. For this reason, it is preferable that the diameter of the micro-particles be within the above-described range. When the particles are made composite particles in this way, the interaction between the particles and the interaction between the particles and the object to which they adhere can be made small; as a consequence, adherence of the particles to the partition wall can be suppressed and the electric field intensity necessary to cause the particles travel is reduced, leading to reduction in the operating voltage. Furthermore, because of the improvement in the traveling characteristics of the particles, improvement in response speed is achieved, and improvement in the filling rate of particles is also attained.

The surfaces of the particles, or at least a portion of the surface of a member on which the particles adhere, may be subjected to a water-repelling treatment.

In such a configuration, the water-repelling treatment may be carried out by forming a water repellent film. For example, if the particles adhere to the surface of the partition wall or the substrate with water in between, the adhesive force of the particles is greater by the surface tension of water droplets; for this reason, a higher operating voltage is necessary to detach the particles therefrom. In the configuration in which the water-repelling treatment is performed, however, the surface tension does not act when detaching the particles from the surface of the partition wall or the substrate, leading to reduction in the operating voltage.

The present invention provides a method of manufacturing a display device, including a pair of substrates opposed to each other and provided with electrodes, at least one of the substrates is light-transmissive and at least one of the electrodes is formed on at least one surface of the substrates, a spacer disposed between the substrates for retaining a space having a desired width, at least one kind of group of electrostatic particles contained in the space between the substrates, and a vibration generating portion provided so as to face the space in which the group of particles travel, the device being configured to display an image corresponding to an image signal voltage applied to the electrodes by causing the group of particles to travel in the space between the substrate by an electric field produced by the image signal voltage, the method comprising, a step to contain the group of particles in the space between substrates, and a step to generate vibration by the vibration-generating portion after the particles containing step.

Such a configuration makes it possible to disperse the group of particles contained in the space uniformly and evenly by the vibration generated by the vibration-generating portion. Therefore, a display device is realized in which the occurrence of luminance unevenness is suppressed.

The present invention also provides a method of manufacturing a display device, including a partition wall for partitioning into pixels a space formed between a pair of opposed substrates, at least one of which is transparent, substrate-side electrode connected to a voltage applying means and provided on an inner surface of at least one of the substrates for each of the pixels, and a partition wall-side electrode provided on the partition wall for each of the pixels and connected to the voltage applying means, the device being configured to display an image corresponding to an image signal voltage by causing at least one kind of plural charged colored particles internally existing in the space to travel in the space by an electric field produced by the image signal voltage applied to at least the substrate-side electrode, the method comprising, a step to contain at least one kind of plural charged colored particles in the space, and a step to apply an AC voltage to at least the substrate-side electrode to generate an alternating electric field in the space after the particles containing step.

Such a configuration makes it possible to disperse the particles contained in the space uniformly and evenly by the alternating electric field generated in the space. Thus, the occurrence of luminance unevenness can be suppressed.

As described above, the display devices and the methods of manufacturing according to the present invention make it possible to prevent the occurrence of luminance unevenness and contrast degradation and achieve good display operations and reduction in the operating voltage. Such display devices according to the invention are advantageous as display devices that not only enable prevention of the occurrence of luminance unevenness and contrast degradation but also achieve reduction in the operating voltage, and are especially advantageous for use in electronic papers that are foldable and have a very light weight and small thickness so that they can be used as an alternative to paper.

The above and further objects and features of the invention will be more fully apparent from the following detailed description with accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

With reference to the drawings, the present invention is detailed below.

First Preferred Embodiment

Figure 1:
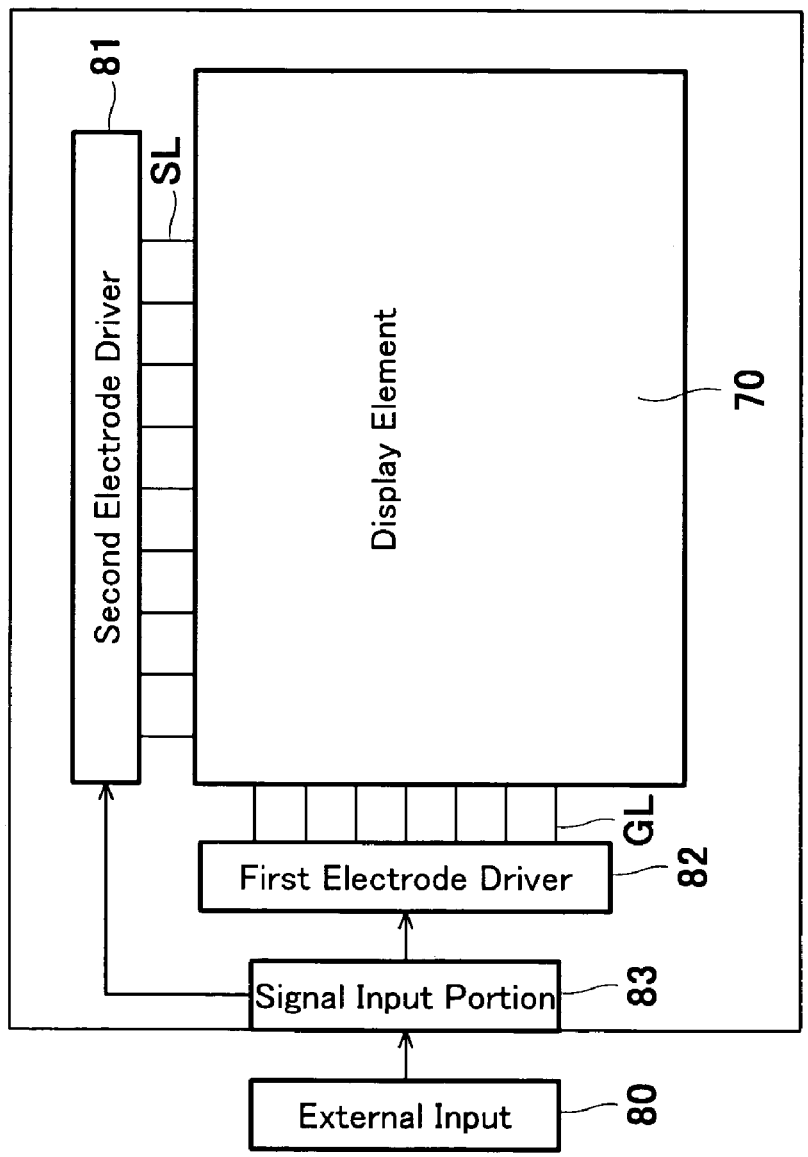
FIG. 1 is a schematic view showing a display device according to a first preferred embodiment of the present invention.
Figure 2A:
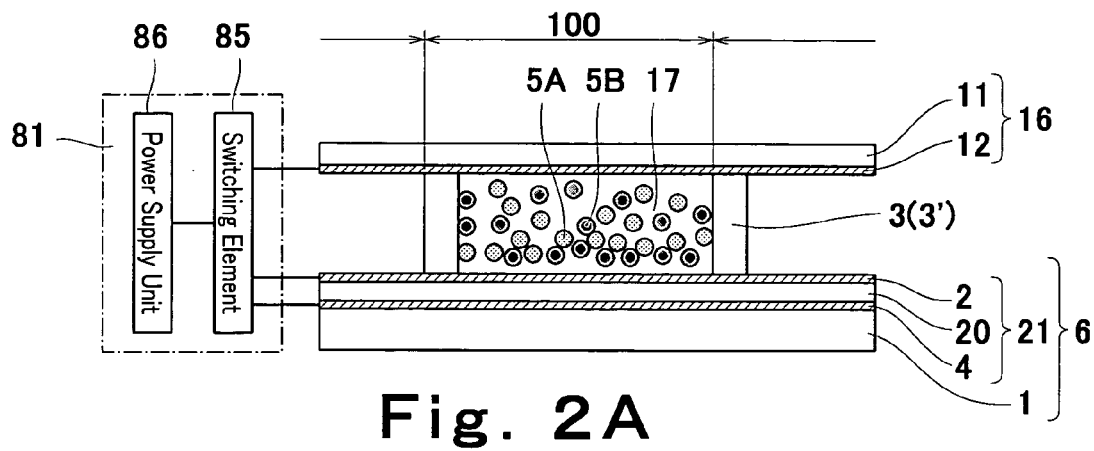
FIGS. 2A to 2C are schematic views showing the configuration and display operation in a pixel, which is a constitutional unit, of a display element in the display device of FIG. 1, in vertical cross sections of the display element, FIG. 2B showing an operation during a black display and FIG. 2C showing an operation during a white display.
Figure 2B:
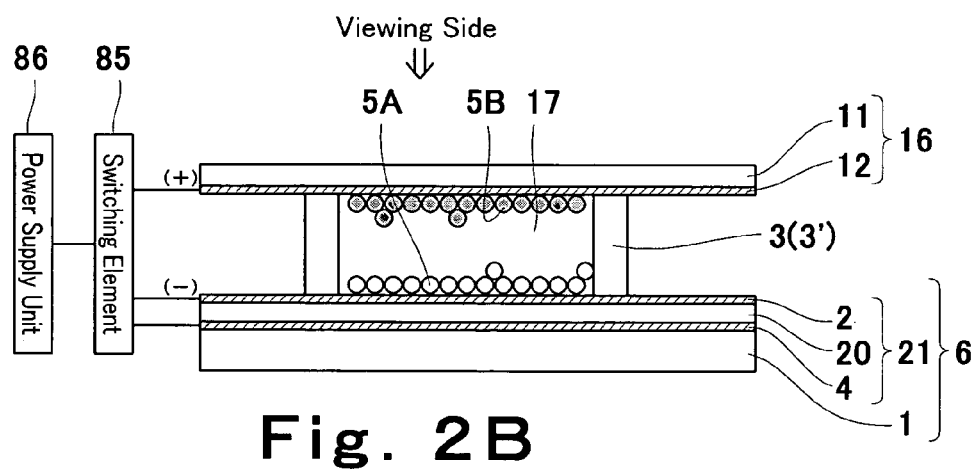
Figure 2C:
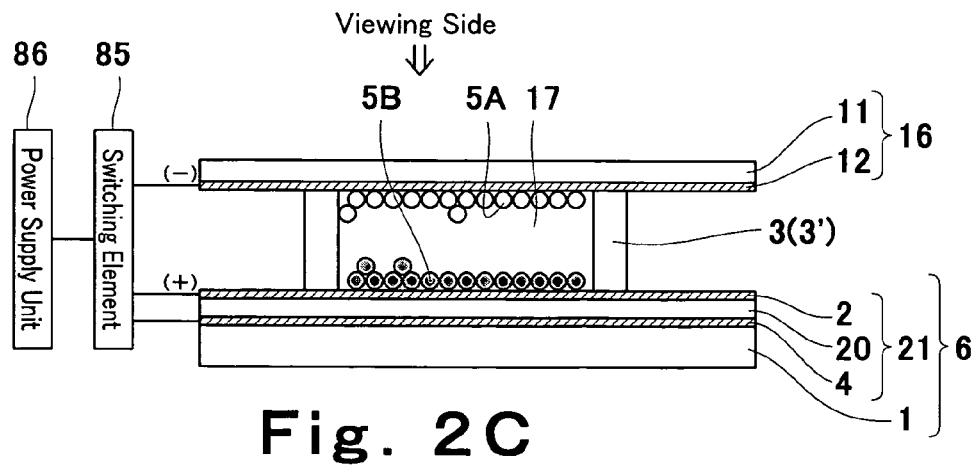

FIG. 1 is a schematic view showing a display device according to a first preferred embodiment of the present invention. FIGS. 2A to 2C are schematic views showing the configuration of a pixel that constitutes a display element of the display device shown in FIG. 1, which show its cross sections perpendicular to the display screen (hereafter, referred to as "vertical cross sections").

As shown in FIGS. 1 and 2A to 2C, the display portion of the display device is composed of a display element 70, which is a display panel. The display element 70 has, as shown in FIGS. 2A to 2C, a lower substrate 6 and an upper substrate 16, and the substrates 6 and 16 are opposed to each other by being supported by a spacer 3' to have a desired gap distance. Thereby, a space 17 is formed between the substrates 6 and 16. The space 17 is partitioned by the spacer 3', and thus, the spacer 3' is referred to as a partition wall 3 herein. Each individual region of the space 17 partitioned by the partition wall 3 corresponds to each one of the pixels 100. The space 17 may be in a gas phase or in a liquid phase. Herein, the space 17 is in a gas phase. In the space 17, white particles 5A and black particles 5B are contained.

On the inner surface of the lower substrate 6, a first electrode 2 is provided, and on the inner surface of the upper substrate 16, a second electrode 12 is provided. Although not shown in FIGS. 2A to 2C, which show vertical cross sections of the display element 70, the first electrode 2 provided on the lower substrate 6 and the second electrode 12 provided on the upper substrate 16 intersect with each other when viewed in plan, and an operating voltage is applied to the intersecting portions. Each of the intersecting portions at which the operating voltage is applied to perform a display operation corresponds to each pixel 100, which is a constitutional unit of the display element 70. Meanwhile, the portions where the first electrode 2 and the second electrode 12 do not intersect with each other result in a smaller voltage than a threshold value, and consequently do not perform display. The display element 70 is so configured that a plurality of pixels 100 partitioned by the partition wall 3 as described above are aligned in a matrix. The first electrode 2 is disposed so as to extend in a transverse direction of the display element 70, whereas the second electrode 12 are disposed so as to extend in a longitudinal direction of the display element 70. Thus, the display device of the present embodiment is of a passive matrix drive type.

Provided in a peripheral portion of the display element 70 are a first electrode driver 82 for driving the first electrode 2 and a second electrode driver 81 for driving the second electrode 12. In addition, an external input device 80 is provided for controlling the first electrode driver 82 and the second electrode driver 81 in response to an external input signal. In the display device thus configured, the external input device 80 outputs respective control signals to the first electrode driver 82 and the second electrode driver 81 in response to an external input image signal into a signal input portion 83 from external. Then, the first electrode driver 82 applies a predetermined voltage to the first electrode 2, and meanwhile, the second electrode driver 81 applies a voltage corresponding to the image signal to the second electrode 12 in proper timing for the second electrode 12. Thus, as will be described later, in each of the pixels 100, the white particles 5A and the black particles 5B travel in the space 17 between the lower substrate 6 and the upper substrate 16. As a result, an image corresponding to the image signal is observed by the eyes of the viewer who observes the display device.

Next, the configuration of the display element 70 of FIG. 1 is described in detail with reference to FIGS. 2A to 2C.

As shown in FIGS. 2A to 2C, the upper substrate 16 has a second substrate 11. Because the upper substrate 16 side becomes a viewing side, the second substrate 11 needs to have a light transmittance; therefore, it is composed of a material having a high light transmissivity, such as a glass substrate or a polyethylene terephthalate (PET) sheet. On the second substrate 11, the second electrode 12 made of a conductive material is provided. Like the second substrate 11, the second electrode 12 needs to have light transmittance, and therefore, it is composed of a material having a high light transmissivity, such as ITO (Indium Tin Oxide). As will be described later, the second electrode 12 is connected to a first common line (not shown), for each of the pixels 100 partitioned by the partition wall 3. It should be noted that the constituent materials for the second substrate 11 and the second electrode 12 are not limited to the above-mentioned materials, but may be other materials.

On the other hand, the lower substrate 6 has a first substrate 1. The first substrate 1 may have a large thickness and may be a glass substrate, a polyethylene terephthalate sheet, a stainless film, or the like. In terms of its durability, a material having flexibility is desired. The material that constitutes the first substrate 1 may be light transmissive or opaque. On the first substrate 1, a third electrode 4, a piezoelectric material 20, and the first electrode 2 are provided in that order. Thus, by a configuration in which the piezoelectric material 20 is sandwiched by the first and third electrodes 2 and 4, a vibration-generating portion 21 is formed on the first substrate 1. The first and third electrodes 2 and 4 are composed of a conductive material, which may be light transmissive or opaque. For example, the first and third electrodes 2 and 4 may be composed of the same material as that of the second electrode 12, in which case it is possible to reduce the material cost.

The piezoelectric material 20 of the vibration-generating portion 21 is, for example, composed of a single crystal of quartz, LiTaO$_3$ or the like, a thin film of ZnO or the like, a piezoelectric ceramic, a piezoelectric polymer film of, polyvinylidene fluoride (PVDF), or the like. Herein, although the vibration-generating portion 21 provided with the piezoelectric material 20 has a multi-layered structure, vibration is more easily transmitted to the black particles 5B and the white particles 5A in comparison with the case where the vibration-generating portion 21 is provided outside the display element 70 (for example, on a surface of the first substrate 1 that is opposed to the space 17) because the vibration-generating portion 21 is disposed inside the display element 70 so that vibration can be directly transmitted to the black particles 5B and the white particles 5A in the space 17. For this reason, the vibration-generating portion 21 may have such a number of layers that the vibration can be transmitted to the particles in the space 17, and accordingly, the thickness can be reduced in comparison with the case where it is provided outside the display element 70.

The piezoelectric material 20 thus configured may be divided (patterned) for each individual pixel 100, or may be provided in common to the pixels 100. Herein, a case is described in which only the lower substrate 6 side is provided with the vibration-generating portion 21, but it is possible to adopt a configuration in which the vibration-generating portions 21 are provided on both the upper substrate 16 and the lower substrate 6. Further, the vibration-generating portion 21 is provided on the first substrate 1 herein, but it is possible to adopt a configuration in which the vibration-generating portion 21 provided with the piezoelectric material 20 also serves as the first substrate 1, in which case considerable thickness reduction and weight reduction of the display element 70 can be realized.

The lower substrate 6 and the upper substrate 16 are opposed to each other so as to face the second electrode 12 and the first electrode 2, respectively, whereby the space 17 is formed between the substrates 6 and 16. The spacer 3', serving as a space-retaining member, is provided between the upper substrate 16 and the lower substrate 6 to support the substrates 6 and 16, whereby the distance between the substrates 6, 16 (that is, the width of the space 17) is retained to be invariable. In this way, by provision of the spacer 3' extending from the lower substrate 6 to the upper substrate 16, the space 17 is partitioned by the spacer 3' and each of the regions partitioned corresponds to each of the pixels 100. Thus, in addition to functioning as a space-retaining member, the spacer 3' functions as a partition wall for dividing the space 17 into individual pixels 100, and moreover has a function of insulating the second electrode 12 formed on the upper substrate 16 and the first electrode 2 formed on the lower substrate 6. Hereafter, the spacer 3' may be referred to as a partition wall 3.

The spacer 3' needs to be composed of an insulating material that does not considerably alter the later-described electrical characteristics (for example, charging characteristic) of the white particles 5A and the black particles 5B, and is made by casting, for example, polyethylene terephthalate, a polyester film, a silicon rubber sheet, or polycarbonate. For example, with a spacer 3' made by layered insulating films, it is possible to produce a space 17 having a desired width with a laminating process of the insulating films.

In the space 17 partitioned for each pixel 100, a plurality of black particles 5B and a plurality of white particles 5A are contained. It is desirable that the black particles 5B and the white particles 5A have different electrical characteristics and magnetic properties; herein, the black particles 5B are negatively charged insulative particles, whereas the white particles 5A are positively charged insulative particles. Both the white particles 5A and the black particles 5B are porous particles, and both of them are composite particles composed of larger-diameter core particles and micro-particles. The diameter of the each micro-particles is from about $\frac{1}{1000}$ to about $\frac{1}{100}$ of the diameter of the core particles and fixed to the core particles in a manner to cover the surface of the core particles. The above-described black particles 5B have approximately an equal size to each other, and the white particles 5A have approximately an equal size to each other; moreover, the size of the black particles 5B and the size of the white particles 5A are also approximately equal to each other.

The first electrode 2, the second electrode 12, and the third electrode 4 are connected to a power supply unit 86 via a switching element 85 that allows switching of the voltage application path. Herein, the second electrode driver 81 (see FIG. 1) has the power supply unit 86 and the switching element 85, and the switching by the switching element 85 is carried out according to image signals. The above-described power supply unit 86 and switching element 85 are, as will be described later, configured so as to apply a DC voltage according to image signals between the first and the second electrodes 2 and 12 and to apply a high-frequency sine wave voltage between the first and third electrodes 2 and 4 in order to generate vibration with the vibration-generating portion 21.

Next, referring to FIGS. 2B and 2C, a display operation in the display device (i.e., a driving method for the display device) is discussed, focusing on a pixel 100, which is the constitutional unit of the display element 70. It should be noted that the operation described in the following is carried out separately in each of the plurality of pixels 100, and an image is thereby displayed.

FIG. 2B shows a display operation during a black display, and FIG. 2C shows a display operation during a white display. Herein, the following describes a case where rewriting is performed from the black display to the white display.

As shown in FIG. 2B, during the black display operation, a signal voltage according to an image signal is applied between the first electrode 2 and the second electrode 12. This signal voltage is a DC voltage. Herein, switching of the voltage application path is carried out by the switching element 85 so that a potential Vb of the first electrode 2 becomes negative and a potential Va of the second electrode 12 becomes positive. Also, switching of the voltage application path is carried out by the switching element 85 so that no voltage is applied between the first electrode 2 and the third electrode 4. By the voltage application between the first and second electrodes 2 and 12, an electric field obtained by a voltage (Va-Vb) is applied between the electrodes 2 and 12. Herein, since (Va-Vb) is positive, an electric field directed from the lower substrate 6 toward the upper substrate 16 is applied, turning the first electrode 2 into a negative electrode and the second electrode 12 into a positive electrode. Accordingly, the negatively charged black particles 5B travel toward the second electrode 12, which is the positive electrode, and adhere to the electrode surface, whereas the positively charged white particles 5A travel toward the first electrode 2, which is the negative electrode, and adhere to the electrode surface. As a consequence, when viewed from the upper substrate 16 side, the display screen is covered by the black particles 5B, resulting in a black display.

After applying a signal voltage between the first and second electrodes 2 and 12 as described above, the voltage application is stopped by controlling the power supply unit 86, to attain a no-voltage state. Even in such a no-voltage state, adherence of the black particles 5B to the second electrode 12 is retained by the van der Waals force between the particles and between the particles and the electrode 12 and the adhesive force such as an image force. Likewise, adherence of the white particles 5A to the first electrode 2 is also maintained. As a consequence, under this condition, the black display is maintained.

Subsequently, rewriting is carried out from the black display as described above to a white display shown in FIG. 2C. At this time, prior to performing the white display operation, vibration is generated by the vibration-generating portion 21, and using the vibration, the display image (black display image herein) is erased. The details are given below.

As has been a problem to date, when the black particles 5B and the white particles 5A are caused to travel toward the respective electrodes 12 and 2 in the space 17 for the display operation, the black particles 5B and the white particles 5A having different charging characteristics come in contact with one another, causing aggregation of the particles. In addition, due to the image force or the like, the black particles 5B and the white particles 5A adhere to the surface of the partition wall 3, and aggregation of particles occurs in the vicinity of the partition wall 3. As a result, the number of particles that are utilized for the display operation reduces. For example, in the foregoing black display, the reduction in the number of the black particles 5B utilized for the display operation produces gaps in the region covered by the black particles 5B, and through the gaps, the colors of the white particles 5A or the lower substrate 16 can be observed. This leads to luminance unevenness and contrast degradation.

In view of this problem, herein, in order to prevent such luminance unevenness and contrast degradation, vibration is imparted to the black and white particles 5B and 5A. Therefore, the aggregated particles are crushed and dissociated, and the particles adhered to the partition wall 3 are detached therefrom by the vibration. Then, the dissociated and detached black and white particles 5B and 5A are dispersed in the space 17.

Specifically, in the above-described black display state, in which the adherence of the black particles 5B to the second electrode 12 and adherence of the white particles 5A to the first electrode 2 are maintained with no voltage applied, the voltage application path is switched over by the switching element 85 so that an electric field is applied between the first electrode 2 and the third electrode 4, and the first and third electrodes 2 and 4 are connected to the power supply unit 86. Also, a high-frequency sine wave voltage is applied between the first and third electrodes 2 and 4. At this time, no voltage is applied between the first and second electrodes 2 and 12. By the voltage application to the first and third electrodes 2 and 4 as described above, a piezoelectric effect occurs in the piezoelectric material 20 sandwiched by the first and third electrodes 2 and 4, causing vibration in the vibration-generating portion 21.

The vibration caused by the vibration-generating portion 21 is transmitted to the black and white particles 5B and 5A in the space 17. By imparting such vibration, the black and white particles 5B and 5A are detached from the surfaces of the first and second electrodes 2 and 12 and the partition wall 3 on which they have adhered, and the aggregated particles are crushed and dissociated. Then, the dissociated and detached black and white particles 5B and 5A are dispersed in the space 17. The black display image is thereby erased. In addition, since friction is caused between the particles when vibration is imparted thereto, it is possible to increase the amount of electrostatic charge in the black and white particles 5B and 5A that has reduced over the display time.

After an image is erased by generating vibration with the vibration-generating portion 21 as described above, a white display operation is carried out to rewrite the image to the white display. In the white display operation, as shown in FIG. 2C, a signal voltage corresponding to an image signal is applied between the first electrode 2 and the second electrode 12. Herein, in contrast to the case of the foregoing black display, switching of the voltage application path is carried out by the switching element 85 so that the potential Vb of the first electrode 2 becomes positive while the potential Va of the second electrode 12 becomes negative, and a DC voltage is applied between the first and second electrodes 2 and 12. At this time, switching of the voltage application path is carried out by the switching element 85 so that no voltage is applied between the first and third electrodes 2 and 4. By the voltage application to the first and second electrodes 2 and 12 as described above, an electric field obtained by a voltage (Va-Vb) is applied between the electrodes 2 and 12. Herein, since (Va-Vb) is negative, an electric field directed from the upper substrate 16 side toward the lower substrate 6 side is applied, turning the first electrode 2 into a positive electrode and the second electrode 12 into a negative electrode. Accordingly, the negatively charged black particles 5B travel toward the first electrode 2, which is the positive electrode, and adhere to the electrode surface, whereas the positively charged white particles 5A travel toward second electrode 12, which is the negative electrode, and adhere to the electrode surface. As a consequence, when viewed from the upper substrate 16 side, the display screen is covered by the white particles 5A, resulting in a white display.

In the white display operation such as described above, because the display operation is performed by utilizing the black and white particles 5B and 5A that have been dissociated and detached by imparting vibration and been dispersed in the space 17, the number of the particles utilized for the display operation does not decrease, and the proportion of the particles that contribute to the display operation increases. For this reason, it becomes possible to cover the display screen with the white particles 5A without any gaps therein, and to prevent the colors of the black particles 5B and the lower substrate 6 from being observed through the gaps between the white particles 5A. Thus, luminance unevenness and contrast degradation are prevented.

Moreover, because the white and black particles 5A and 5B that have adhered to the first and second electrodes 2 and 12 are detached from the electrode surfaces using vibration in advance, it is unnecessary to detach the white and black particles 5A and 5B from the first and second electrodes 2 and 12 when the white and black particles 5A and 5B are caused to travel; likewise, because the aggregated white and black particles 5A and 5B are dissociated using vibration in advance, it is unnecessary to dissociate aggregated particles when the particles are caused to travel. Therefore, it is possible to achieve reduction in the operating voltage required for the particle traveling.

After applying a voltage between the first and second electrodes 2 and 12 as described above, the voltage application is stopped by controlling the power supply unit 86, to attain a no-voltage state. Even in such a no-voltage state, adherence of the black particles 5B to the first electrode 2 and adherence of the white particles 5A to the second electrode 12 are retained by the van der Waals force and the adhesive force such as the image force between the particles and between the particles and the electrodes. Thus, the white display is retained.

To rewrite the display image from the white display to the black display, a high-frequency sine wave voltage is applied between the first and third electrodes 2 and 4 to erase the display image as in the above-described case of rewriting from the black display to the white display, and thereafter, a black display operation is carried out.

With a desired display operation thus performed in each of the pixels 100 in this manner, the display device displays images thereon. It should be noted here that when vibration is generated with the vibration-generating portion 21 by applying a high-frequency sine wave voltage between the first and third electrodes 2 and 4 as described above, a voltage may be applied only to the pixels 100 that require the image to be rewritten and the vibration may be generated in pixels 100. For example, in a configuration in which the piezoelectric material 20 is divided (patterned) for each pixel 100 and the third electrode 4 is connected to a common line (not shown) for each pixel 100, it is possible to realize a configuration in which vibration is generated in the pixels 100 that require the display image to be rewritten by applying a voltage only to the first and third electrodes 2 and 4 in the pixels 100 whereas vibration is not generated in the pixels 100 that do not require rewriting.

In the display device of the present embodiment, the aggregated particles can be dissociated and the particles that have adhered to the partition wall 3 can be detached therefrom by the vibration generated by the vibration-generating portion 21, and therefore, it is possible to suppress the aggregation and adherence of particles even if the display rewriting as described above is carried out repeatedly according to image signals. This makes it possible to increase the proportion of the utilized particles and thus prevent luminance unevenness and contrast degradation; as a result, good display characteristics can be achieved. In addition, by imparting vibration, reduction in the amount of electrostatic charge in the black and white particles 5B and 5A can be prevented, and therefore, a stable, good display operation becomes possible. Moreover, a display operation is performed such that display is erased once and thereafter the black and white particles 5B and 5A are caused to travel between the first and second electrodes 2 and 12; as a consequence, the display operation does not require the energy for dissociating and dispersing aggregated particles and the energy for detaching the black and white particles 5B and 5A from the first and second electrodes 2 and 12 or from the partition wall 3. Consequently, the operating voltage is reduced, and the power consumption of the display device can be reduced.

Moreover, in such a display device, because the first electrode 2 to which a signal voltage for display is applied also serves as the electrode of the vibration-generating portion 21, cost reduction is achieved and, at the same time, thickness reduction and weight reduction of the device is attained. Furthermore, the vibration-generating portion 21 is disposed inside the display element 70 (that is, the space 17 side), and therefore, it becomes possible to transmit the vibration to the black particles 5B and the white particles 5A in the space 17 directly. Thus, the vibration can be easily transmitted to the black and white particles 5B and 5A, and accordingly, it becomes possible to reduce the width of the amplitude of the vibration. This makes it possible to lower the operating voltage of the vibration-generating portion 21 and reduce power consumption.

In addition, since the space 17 between the upper substrate 16 and the lower substrate 6 is partitioned by the partition wall 3 for each pixel 100, it is possible to suppress traveling of the black particles 5B and the white particles 5A to adjacent pixels 100, and consequently, the black and white particles 5B and 5A are prevented from gathering in specific regions. Accordingly, the total amount of particles in each of the pixels 100 can be always maintained to be invariable. Further, in manufacturing the display device herein, by applying a high-frequency sine wave voltage between the first and third electrodes 2 and 4 after the black and white particles 5B and 5A have been contained in the space 17, the vibration generated by the vibration-generating portion 21 is imparted to the contained black and white particles 5B and 5A. This makes it possible to disperse the black and white particles 5B and 5A uniformly over the substrate surface in the pixel 100. Thus, the particles in each pixel 100 can be uniformly dispersed. As a result of these, luminance unevenness can be further reduced.

Furthermore, since the black particles 5B and the white particles 5A are porous, and are composite particles of core particles and micro-particles, the interaction between particles and the interaction between particles and an object to which they adhere can be reduced as will be described in the following, and as a result, reduction in operating voltage and high-speed response can be achieved.

Specifically, since the black particles 5B and the white particles 5A are porous, the specific gravity of the particles is small and the molecular weight thereof is also small. Accordingly, it can be expected that the van der Waals force between the particles and between the particles and the electrodes, which are the objects to which they adhere, will be decreased. If the van der Waals force decreases, it becomes possible to reduce the adhesive force between a plurality and the adhesive force between the particles and the electrodes. Also, being lightweight, the particles can delay the precipitation of the particles and result in a floating state. In such a floating state, it is unnecessary to detach the particles from the electrodes or the like, so it becomes possible to cause the particles to travel quickly at a low voltage. Further herein, the size of the particles with the same color is equal to each other and the size of the particles with different colors is also equal to each other, as described above; and therefore, unlike the case where the sizes of particles are different, the distribution of the particles doesn't become non-uniform and, it is not necessary to apply a voltage for detaching smaller particles that have been attached to larger particles therefrom. Still further, because the black particles 5B and the white particles 5A are composite particles including the micro-particles, it becomes possible to increase the distance between the core particles that travel in the space 17 and contribute directly to the display and the distance between the core particles and the electrodes to which the core particles adhere, by the size of the micro-particles. Thus, it becomes possible to reduce the van der Waals force and to reduce the adhesive force.

It should be noted that although the foregoing has described a case in which the black and white particles 5B and 5A directly come into contact with the surfaces of the first and second electrodes 2 and 12, in terms of charging characteristics, it is preferable that an insulating film be formed on each of the surfaces of the first and second electrodes 2 and 12 that come in contact with the particles. When an insulating film is provided, the electrical characteristics of the particles is preserved for a long period since the insulating film forms a capacitor. It is preferable that the insulating film should be such that it does not alter the electrical characteristics and magnetic properties of the particles significantly.

The surfaces of the first and second electrodes 2 and 12 and the partition wall 3 facing the space 17, as well as the surfaces of the black and white particles 5B and 5A, may be subjected to a water-repelling treatment; for example, a water repellent film may be formed on these surfaces. If water droplets produced by concentration of the moisture in the space 17 or the like are present on the surfaces of the first and second electrodes 2 and 12 and the partition wall 3, the adhesive force of the black and white particles 5B and 5A that have adhered to the surfaces of the first and second electrodes 2 and 12 and on the surface of the partition wall 3 through the water droplets becomes greater by the surface tension of the water droplets correspondingly. This necessitates a greater operating voltage when applying an electric field of opposite polarities to cause the particles 5B and 5A to travel. In contrast, if the surfaces of the black particles 5B and the white particles 5A, or the surfaces of the first and second electrodes 2 and 12 and the surface of partition wall 3, are subjected to a water-repelling treatment by forming a water repellent film thereon, the surface tension of water droplets does not have the effect when the particles travel, thus, it is possible to achieve further reduction in the operating voltage.

Furthermore, although the foregoing has described a case in which, in order to erase display one time, the generation of vibration by the vibration-generating portion 21 is performed in different timing from the traveling of the black and white particles 5B and 5A for display, it is possible to perform the generation of the vibration and the traveling of the particles simultaneously; that is, it is possible to cause the particles to travel while vibration is being generated by the vibration-generating portion 21.

EXAMPLE

This Example specifically discusses a method of manufacturing a display element according to the present embodiment. Herein, 1.1 mm thick glass substrates are used for the first and second substrates 1 and 11. First, serving as a second electrode 12, an ITO film, which is a light-transmissive, conductive material, is formed on one of the surfaces of a glass substrate that is a second substrate 11. Then, after washing the glass substrate having the ITO film formed thereon, a polycarbonate thin film which has a high hardness is formed on the ITO film. Then, polycarbonate is dissolved in tetrahydrofuran, whereby a 2-5 μm thick insulating film composed of polycarbonate is formed. Here, it is more ideal that the terminal group of the polycarbonate is modified to improve adhesiveness with ITO. In the manner as described above, a upper substrate 16 is produced, in which the second electrode 12 and the insulating film (not shown) are formed on the second substrate 11.

Meanwhile, in producing the lower substrate 6, at first, an ITO film, which serves as the third electrode 4, is formed on a glass substrate that is the first substrate 1 in a similar manner to that described above. Then, a piezoelectric material 20 composed of lead zirconate titanate (PZT) is formed on the ITO film. Further, an ITO film serving as the first electrode 2 is formed on the piezoelectric material 20, and a polycarbonate film serving as an insulating film is formed on the first electrode 2 in a similar manner to that described above. In the manner as described above, the lower substrate 6 is produced, in which the third electrode, the piezoelectric material 20, the first electrode 2, and the insulating film (not shown) are formed on the first substrate 1.

Subsequently, a spacer 3' is disposed on the surface of the lower substrate 6, or on the surface of the upper substrate 16 formed as described above. Herein, as the spacer 3', a lattice-like polyethylene terephthalate sheet having 1 cm square-shaped holes is provided on the first electrode 2 of the lower substrate 6. The thickness of this sheet is 100 μm. Each one region partitioned by with the spacer 3' and formed upper the first substrate 1 corresponds to one pixel region.

A plurality of the black particles 5B and the white particles 5A are filled into the spaces 17 upper the first electrode 2 that are partitioned by the spacer 3', that is, into the spaces 17 within each one pixel 100. Herein, 5 μm acryl-based particles containing carbon black that have been surface-modified are used as the black particles 5B. In addition, 5 μm acryl-based particles containing titanium oxide that have been surface-modified are used as the white particles 5A. A mixture of the black particles 5B and the white particles 5A in equal proportions are sufficiently stirred with a Henschel mixer to mix it uniformly and evenly. Thereby, the black particles 5B are charged negatively, whereas the white particles 5A are charged positively. Then, 6 mg of the above-described mixed particles is sieved off in the space 17 of each pixel 100 uniformly and evenly. Then, the upper substrate 16 is overlaid on the spacer 3' disposed on the lower substrate 6 to seal the spaces 17, and the lower substrate 6 and the upper substrate 16 are fastened with a binder clip to fix them. Thereafter, the first, second, and third electrodes 2, 12, and 4 are connected to the power supply unit 86, and the voltage application paths are arranged.

Thereafter, in order to disperse the black and white particles 5B and 5A uniformly over the substrate surface, a high-frequency sine wave voltage is applied between the first electrode 2 and the third electrode 4, and the vibration is generated by the vibration-generating portion 21 at the piezoelectric effect of the piezoelectric material 20. Such a voltage application is carried out, for example, immediately before shipping the finished product of the display device. The vibration generated by the vibration-generating portion 21 is transmitted to the black particles 5B and the white particles 5A in the space 17, and thereby, it is made possible to disperse the black particles 5B and the white particles 5A uniformly and evenly over the substrate surface in each pixel 100. For example, once such a voltage application is carried out immediately before shipping the display device and the black and white particles 5B and 5A are dispersed uniformly as described above, that effect of dispersing is maintained from then on. Accordingly, the occurrence of luminance unevenness is prevented in the display device. In addition, by imparting vibration to the black and white particles 5B and 5A in this way, particles that are not sufficiently charged are stirred and mixed again, and therefore, good and stable charging characteristics of the black and white particles 5B and 5A are obtained.

Subsequently, in the display element 70 produced in the above-described manner, a voltage is applied between the first and second electrodes 2 and 12 to apply an electric field. At this time, when an electric field (herein, an electric field of 2 V/μm) directed from the first electrode 2 side toward the second electrode 12 side is applied, the second electrode 12 turns to a positive electrode whereas the first electrode 2 turns to a negative electrode, whereby the negatively charged black particles 5B travel to the second electrode 12 side and the positively charged white particles 5A travel to the first electrode 2 side. Consequently, when viewing the display element 70 from the observer side, the display is black. On the other hand, when an electric field (herein, an electric field of −2 V/μm) directed from the second electrode 12 side toward the first electrode 2 side is applied, the first electrode 2 turns to a positive electrode whereas the second electrode 12 turns to a negative electrode, whereby the negatively charged black particles 5B travel to the first electrode 2 side and the positively charged white particles 5A travel to the second electrode 12 side. Consequently, when viewing the display element 70 from the observer side, the display is white.

When rewriting the display, a high-frequency sine wave voltage is applied between the first electrode 2 and the third electrode 4 at first. Thereby, because of the piezoelectric effect produced by the piezoelectric material 20, vibration is generated by the vibration-generating portion 21. With the vibration transmitted to the black and white particles 5B and 5A in the space 17, the particles that have adhered to the surfaces of the upper substrate 16 and the lower substrate 6 are detached and the aggregated particles are dissociated. Then, the detached and dissociated particles are stirred and dispersed, therefore, the display is erased.

In this way, after erasing the display by using the vibration generated by the vibration-generating portion 21, an electric field (2 V/μm for black display, −2 V/μm for white display) necessary for a new display is applied between the first and second electrodes 2 and 12 to cause the black and white particles 5B and 5A to travel, and thus a new display is performed. Rewriting of display images is carried out in this manner. It has been confirmed that the luminance unevenness in the display images rewritten in the above-described manner and reflection density and contrast are increased.

Second Preferred Embodiment

Figure 3:
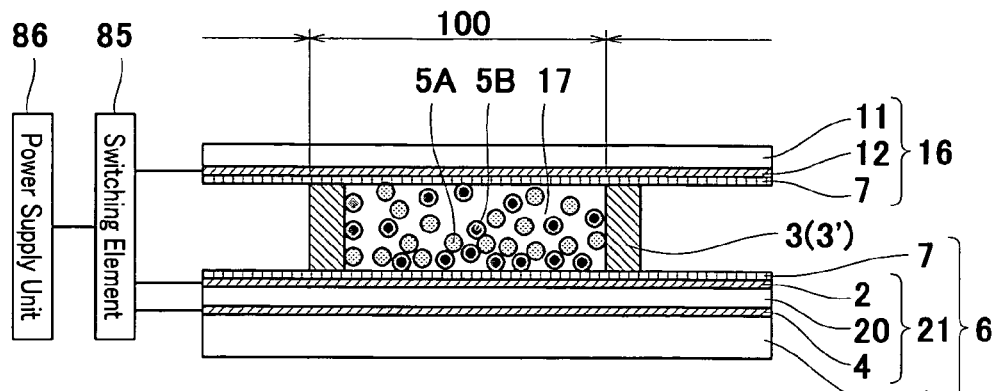
FIG. 3 is a schematic cross-sectional view showing the configuration of a pixel, which is a constitutional unit, of a display element according to a second preferred embodiment of the present invention.

FIG. 3 is a schematic cross-sectional view showing the configuration of a pixel that constitutes a display element of a display device according to a second preferred embodiment of the present invention. As shown in FIG. 3, a display element of the present embodiment has a similar configuration to that of the display element of the first preferred embodiment but differs therefrom in that the black particles 5B has conductivity and that an electron transport layer 7 serving as a charge transport layer is formed on the first and second electrodes 2 and 12.

Although the first preferred embodiment has discussed a case in which both the colored particles have an insulative property, one kind of the particles may be conductive insofar as at least one kind of the particles is insulative. When the colored particles are conductive, it is necessary to form a thin film containing a charge transport material or an insulative film on the surfaces of the first and second electrodes 2 and 12 that come in contact with the particles. The details are described in the following.

For example, in cases where the black particles 5B have conductivity, if the electron transport layer 7 serving as a charge transport layer is not formed on the surfaces of the first and second electrodes 2 and 12, the following will occur. When the black particles 5B reach the second electrode 12 during black display as shown in FIG. 2B and when the black particles 5B reach the first electrode 2 during the white display state as shown in FIG. 2C, the electric charge (electrons) in the particles leaks through the first and second electrodes 2 and 12, and the particles receive the electric charge (positive holes in this case) from the first and second electrodes 2 and 12; thus they are charged to have the same polarity as that of the electrode which they have reached. As a result, the black particles 5B are repelled from the electrode that they have reached, starting to travel to the other electrode having the opposite polarity to that of the electrode that they have reached. Repeating this movement, the black particles 5B perform a reciprocative vibrating motion between the lower and upper substrates 6 and 16, and therefore it is difficult to display.

In view of this, an electron transport layer 7 is formed on the first and second electrodes 2 and 12 in the present embodiment. With this configuration, when the black particles 5B adhere to the second electrode 12 via the electron transport layer 7 during the black display operation shown in FIG. 2B, the electron transport layer 7 selectively inhibits passage of positive holes and at the same time allows only electrons to pass therethrough. This prevents the transfer of positive holes from the second electrode 12 to the black particles 5B, and also permits the transfer of electrons from the second electrode 12 to the black particles 5B. For this reason, in this case, the black particles 5B are not charged with the opposite polarity (positive polarity) to their original polarity (negative polarity), and even if the black particles 5B are conductive, the amount of electrostatic charge is maintained to be uniform to retain the negative polarity. Therefore, the black particles 5B are held on the second electrode 12 side, which is a positive electrode side. In addition, while in the white display shown in FIG. 2C, as in the case of the black display operation, because the electron transport layer 7 is formed on the first electrode 2, positive holes are not transferred from the first electrode 2, which is a positive electrode, to the black particles 5B through the electron transport 7, but only electrons are transferred therethrough. Consequently, the amount of electrostatic charge in the black particles 5B is maintained to be uniform to retain the negative polarity, and therefore, the particles are held on the first electrode 2 side, which is a positive electrode side. Thus, with a configuration in which the electron transport layers 7 are formed on the first and second electrodes 2 and 12, reciprocative vibrating motion of the black particles 5B can be prevented and stable, good display can be performed even if the black particles 5B have conductivity. Moreover, the present example attains similar effects to those attained in the foregoing.

The electron transport material that forms the electron transport layer 7 may be such a chemical compound as a benzoquinone-based compound, a tetracyanoethylene-based compound, a tetracyanoquinodimethane-based, a fluorenone-based compound, a xanthone-based compound, a phenanthraquinone-based compound, a phthalic anhydride-based compound, a diphenoquinone-based compound.

It should be noted that although the foregoing description has discussed a case where the negatively charged black particles 5B have conductivity, as a variation of the present embodiment, the positively charged white particles 5A may have conductivity. In this case, in place of the electron transport layers 7, hole transport layers 7 are provided as the charge transport layers. Consequently, the transfer of electrons from the first and second electrodes 2 and 12 to the white particles 5A is prevented and positive holes are allowed to transfer through the hole transport layer 7, and therefore, the positive charge of the white particles 5A can be maintained. The material for forming such a hole transport layer 7 may be such a low molecular weight compound such as a pyrene-based compound, a carbazole-based compound, a hydrazone-based compound, an oxazole-based compound, an oxadiazole-based compound, a pyrazoline-based compound, an arylamine-based compound, an arylmethane-based compound, a benzidine-based compound, a thiazole-based compound, a stilbene-based compound, a butadiene-based compound, or a butadiene-based compound; or may be a polymer compound such as poly-N-vinylcarbazole, poly(N-vinylcarbazole), polyvinyl pyrene, polyvinyl anthracene, polyvinyl acridine, a pyrene-formaldehyde resin, an ethylcarbazole-formaldehyde resin, a triphenylmethane polymer, or polysilane.

Third Preferred Embodiment

Figure 4:
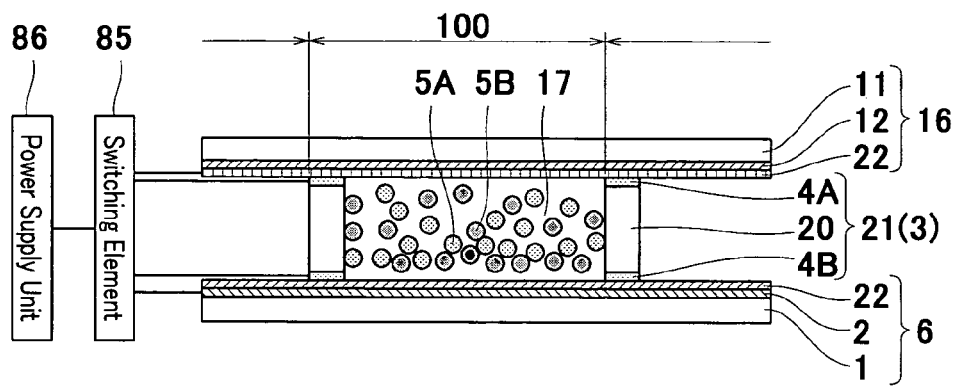
FIG. 4 is a schematic cross-sectional view showing the configuration of a pixel, which is a constitutional unit, of a display element according to a third preferred embodiment of the present invention.

FIG. 4 is a schematic cross-sectional view showing the configuration of a pixel that constitutes a display element of a display device according to a third preferred embodiment of the present invention. As shown in FIG. 3, the partition wall 3 functions as the vibration-generating portion 21 in the display element of the present embodiment.

When manufacturing the display element of the present embodiment, for example, using two glass substrates for the first and second substrates 1 and 11, ITO films serving as the first and second electrodes 2 and 12 are formed on the surfaces of the respective glass substrates, and on the ITO films, for example, polycarbonate films serving as insulating films 22 are formed respectively. Thus, an upper substrate 16 and a lower substrate 6 are prepared.

Next, a sheet-type piezoelectric material 20 (hereafter, piezoelectric material sheet 20), the obverse and reverse surfaces of which are covered with ITO films serving as vibration generating electrodes 4A and 4B, is provided on the surface of the lower substrate 6 or the upper substrate 16 thus prepared. The piezoelectric material sheet 20 is a lattice-like shaped sheet having a plurality of holes, and this piezoelectric material sheet 20 forms the vibration-generating portion 21. Herein, the piezoelectric material sheet 20 serves both as a spacer and the partition wall 3, and each of the regions partitioned by the piezoelectric material sheet 20 corresponds to one pixel region. After providing the piezoelectric material sheet 20 in this way, the white and black particles 5A and 5B are filled in the space 17 of each pixel 100 and sealed by the other one of the substrates. Thereafter, the first and second electrodes 2, 12 and the vibration generating electrode 4A, 4B are connected to the power supply unit 86, and the voltage application paths are arranged. Herein, the power supply unit 86 and the voltage application paths are configured so that a DC voltage is applied between the first and second electrodes 2 and 12 and a high-frequency sine wave voltage is applied between the vibration generating electrodes 4A and 4B of the vibration-generating portion 21. The first and second electrodes 2 and 12 are insulated from the vibration generating electrode 4A and 4B by the insulating films 22.

In the display element manufactured as described above, a high-frequency sine wave voltage is applied between the vibration-generating electrodes 4A and 4B to generate vibration the vibration-generating portion 21, for example, before shipping the product, and by that vibration, particle distribution is made uniform in the pixel 100, as previously described in the first preferred embodiment.

Having such a configuration, the present embodiment makes it possible to generate vibration with the vibration-generating portion 21 by applying a high frequency voltage between the vibration-generating electrodes 4A and 4B. This vibration is used to perform similar operations as those in the first preferred embodiment to perform a display operation and a display erasure operation. Consequently, similar effects to those described in the first preferred embodiment are obtained. Moreover, the vibration-generating portion 21 also serves as the spacer and the partition wall 3 in that configuration, and therefore cost reduction is achieved.

Fourth Preferred Embodiment

Figure 5:
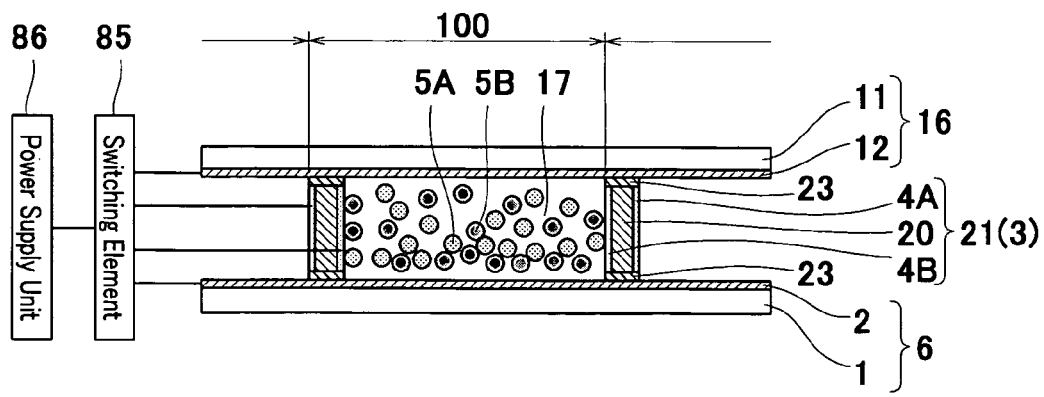
FIG. 5 is a schematic cross-sectional view showing the configuration of a pixel, which is a constitutional unit, of a display element according to a fourth preferred embodiment of the present invention.

FIG. 5 is a schematic cross-sectional view showing the configuration of a pixel that constitutes a display element of a display device according to a fourth preferred embodiment of the present invention. As shown in FIG. 5, in the display element of the present embodiment, the vibration-generating portion 21 functions as a spacer and the partition wall 3, as in the third preferred embodiment.

In the present embodiment, a piezoelectric material 20 is sandwiched between the first and second electrodes 2 and 12 with insulative mediums 23 interposed therebetween. In this way, the space 17 is retained by the piezoelectric material 20, which means that the piezoelectric material 20 functions as a spacer, and by the piezoelectric material 20, the space 17 is partitioned into pixels 100, which means that the piezoelectric material 20 functions as the partition wall 3. In addition, vibration-generating electrodes 4A and 4B are provided on the surfaces of the piezoelectric material 20 that is in contact with the space 17. The vibration-generating electrodes 4A and 4B are formed by, for example, covering the surfaces of the hole portions in the sheet-type piezoelectric material 20 having has a plurality of holes with a conductive film such as an ITO film. The vibration-generating portion 21 is formed by such a configuration in which the piezoelectric material 20 is sandwiched by the vibration-generating electrodes 4A and 4B. The first and second electrodes 2 and 12 and the vibration-generating electrodes 4A and 4B are connected to the power supply unit 86, and herein, the power supply unit 86 and the voltage application paths are configured such that a DC voltage is applied to the first and second electrodes 2 and 12 and a high-frequency sine wave voltage is applied to the vibration-generating electrodes 4A and 4B. Further, voltage application paths to the vibration-generating electrodes 4A and 4B are configured such that the polarities of the potentials of the vibration-generating electrodes 4A and 4B are opposite between adjacent pixels 100.

The vibration-generating electrodes 4A and 4B and the piezoelectric material 20 are insulated from the first and second electrodes 2 and 12 by the insulative mediums 23. The insulative mediums 23 may be insulating films, but it is preferable that they have such a configuration that the vibration generated by the vibration-generating portion 21 can be prevented from being transmitted to the upper substrate 16 and the lower substrate 6. By suppressing the transmission of vibration to the substrates, it becomes possible to transmit the vibration to the black and white particles 5B and 5A in the space 17 more efficiently.

In the present embodiment thus configured, by applying a high-frequency sine wave voltage between the vibration-generating electrodes 4A and 4B, it becomes possible to generate vibration with the vibration-generating portion 21 using the piezoelectric effect of the piezoelectric material 20. The vibration is used to perform a display operation and a display erasure operation similar to those in the first preferred embodiment. Consequently, similar effects to those described in the first preferred embodiment are obtained. Moreover, it is possible to use the vibration-generating electrodes 4A and 4B also as electrodes not being affected by the electric field of adjacent pixels 100 and suppressing the adhesion of the particles onto the partition wall 3.

Fifth Preferred Embodiment

The foregoing first to the fourth preferred embodiments have discussed cases where the space 17 is in a gas phase, but the space 17 may be in a liquid phase.

Figure 6:
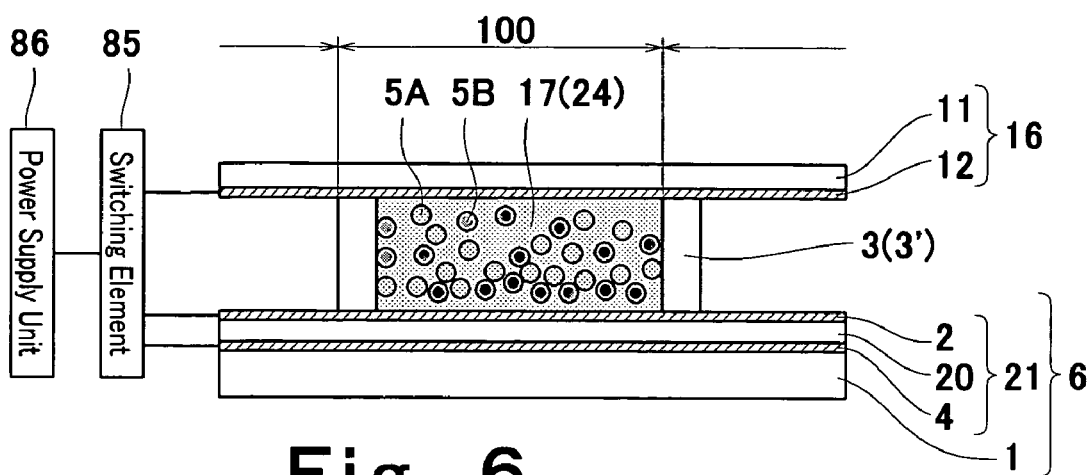
FIG. 6 is a schematic cross-sectional view showing the configuration of a pixel, which is a constitutional unit, of a display element according to a fifth preferred embodiment of the present invention.

FIG. 6 is a schematic cross-sectional view showing the configuration of a pixel that constitutes a display element of a display device according to a fifth preferred embodiment of the present invention. As shown in FIG. 6, the display element of the present embodiment has the same configuration as that of the first preferred embodiment except that the space 17 is in a liquid phase. Specifically, an insulative solvent 24 such as silicon oil is filled in the space 17 formed between the upper substrate 16 and the lower substrate 6, so that the space 17 is in a liquid phase. Although not illustrated in the drawings in detail, the display element of the present embodiment is an active matrix drive type element in which, for each pixel 100, a thin film transistor (TFT) serving as a switching element is formed on the lower substrate 6.

In the present embodiment thus configured, the black display (see FIG. 2B) and the white display (see FIG. 2C) are performed in a similar manner to those in the first preferred embodiment by the electrophoretic phenomenon of the black and white particles 5B and 5A in the insulative solvent 24. Also, a display erasure operation is performed in a similar manner to that in the first preferred embodiment by transmission of the vibration generated by the vibration-generating portion 21 to the black and white particles 5B and 5A in the insulative solvent 24. Therefore, the present embodiment also attains similar advantageous effects to those achieved by the first preferred embodiment. Moreover, in the present embodiment, if the specific gravity of the insulative solvent 24 is matched with the specific gravity of the black and white particles 5B and 5A, dissociation of aggregated particles and detachment of particles from the substrate surfaces or the partition wall surfaces can be carried out more efficiently using the vibration generated by the vibration-generating portion 21.

It should be noted that the present embodiment described above has a configuration in which the basic configuration is same as that of the first preferred embodiment except that the space 17 is in a liquid phase, but it is possible to employ a configuration in which the basic configuration is same as that of either one of the second to fourth preferred embodiments except that the space 17 is in a liquid phase.

Sixth Preferred Embodiment

Figure 7:
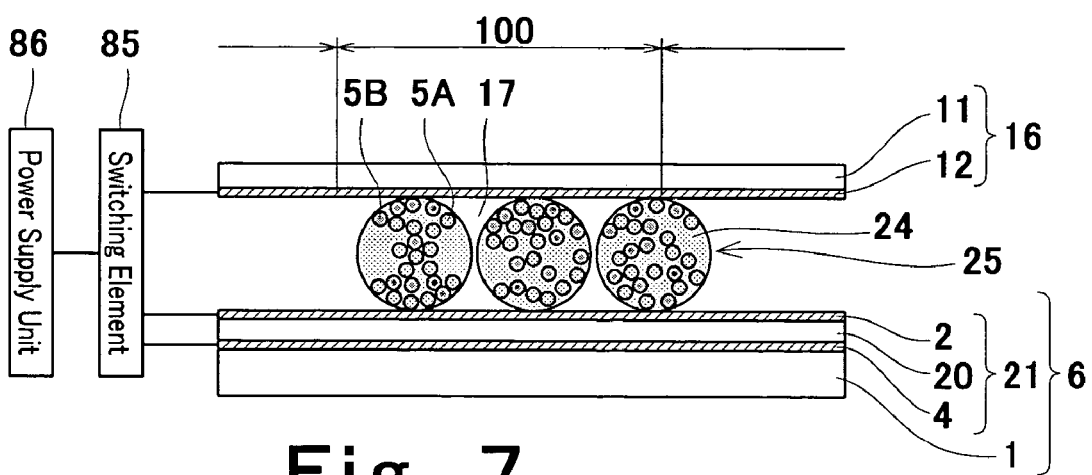
FIG. 7 is a schematic cross-sectional view showing the configuration of a pixel, which is a constitutional unit, of a display element according to a sixth preferred embodiment of the present invention.

FIG. 7 is a schematic cross-sectional view showing a pixel that constitutes a display element of the display device according to a sixth preferred embodiment of the present invention.

As shown in FIG. 7, in the display element of the present embodiment, the space 17 is formed between the upper substrate 16 and the lower substrate 6 having a similar configuration to that of the first preferred embodiment. In the space 17, spherical capsules 25 containing the black and white particles 5B and 5A and the insulative solvent 24 are densely disposed and arranged over the entire substrate surface so that they form one line with respect to the thickness direction of the display element. Thus, in the display element of the present embodiment, the capsules 25 are uniformly arranged over its image display region. Since the capsules 25 have a function as a supporting member for the space 17, such a configuration eliminates the need for the spacer. In addition, because the black and white particles 5B and 5A are sealed in the capsules 25, traveling of the particles does not occur between the pixels 100, and therefore, the partition wall becomes unnecessary.

In the display element thus configured, the black and white particles 5B and 5A electrophoretically travel in the capsule 25, and thereby the black display operation (see FIG. 2B) and the white display operation (FIG. 2C) previously described in the first preferred embodiment as well as the display erasure operation using the vibration generated by the vibration-generating portion 21 are performed inside the capsules 25. Therefore, the present embodiment attains similar advantageous effects to those achieved by the first preferred embodiment. Moreover, since the present embodiment does not require a spacer or a partition wall as described above, cost reduction is achieved and a display element with high flexibility can be easily embodied if a flexible substrate is used.

Seventh Preferred Embodiment

The foregoing first to the sixth preferred embodiments have discussed cases in which a pair of electrodes, namely the first and second electrodes 2 and 12, to which a signal voltage is applied for a display operation, are provided respectively on the upper substrate 16 and the lower substrate 6 so that they are opposed to each other, but both the first and second electrodes 2 and 12 may be provided on either one of the substrate-sides.

Figure 8:
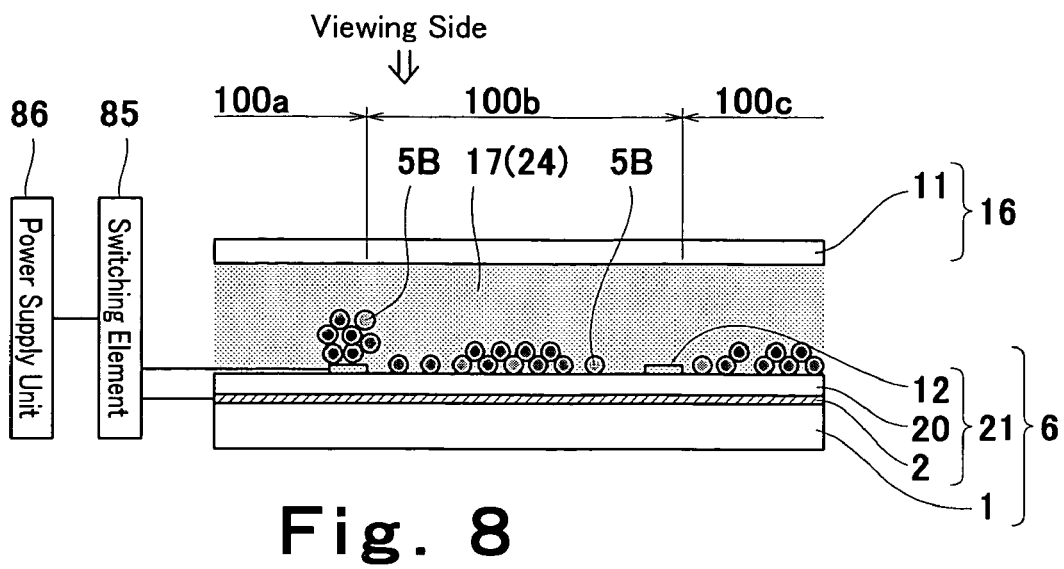
FIG. 8 is a schematic cross-sectional view showing the configuration of a pixel, which is a constitutional unit, of a display element according to a seventh preferred embodiment of the present invention.

FIG. 8 is a schematic cross-sectional view showing the configuration of a pixel that constitutes a display element of a display device according to a seventh preferred embodiment of the present invention.

As shown in FIG. 8, in the display element of the present embodiment, the upper substrate 16 is composed of the second substrate 11 alone, and the first and second electrodes 2 and 12 are provided on the lower substrate 6 side.

Specifically, the first electrode 2 and the piezoelectric material 20 are formed on the first substrate 1 in that order, and the second electrode 12 having a rectangular shape is formed in a predetermined region on the surface of the piezoelectric material 20; thus, the lower substrate 6 is formed. The first and second electrodes 2 and 12 are connected to the power supply unit 86 via a voltage application path provided with a switching element 85. Herein, the voltage application path and the power supply unit 86 are configured such that a DC voltage, which is the image signal voltage, and a high-frequency sine wave voltage, which is the vibration generating voltage, can be applied between the first and second electrodes 2 and 12. In addition, the display element of the present embodiment is an active matrix drive type, and although not shown in the figure, a thin film transistor (TFT) serving as a switching element is provided on the lower substrate 6 for each pixel 100. In this way, voltage applications to each pixel 100 are made possible. An insulative solution 24 is filled in the space 17 formed between the lower substrate 6 and the upper substrate 16, and in the insulative solution 24, black particles 5B are dispersed.

As described above, in the present embodiment, the piezoelectric material 20 is disposed between the first and second electrodes 2 and 12, and thus, the vibration-generating portion 21 is composed of the first and second electrodes 2 and 12 and the piezoelectric material 20. Thus, in the configuration here, the electrodes for display operations also serve as the vibration-generating electrodes.

In the display element of the present embodiment thus configured, a DC voltage, which is the image signal voltage is applied between the first and second electrodes 2 and 12 during its display operation. Due to the electric field produced between the first and second electrodes 2 and 12 by this voltage application, the black particles 5B travel according to their charging characteristics. For example, if an electric field directed from the first electrode 2 toward the second electrode 12 is produced, the first electrode 2 becomes a negative electrode whereas the second electrode 12 becomes a positive electrode. At this time, the negatively charged black particles 5B travel to the second electrode 12 side and adhere to the surface of the second electrode 12. Accordingly, as seen in a pixel 100a, when observed from the upper substrate 16 side, which is the viewing side, the color of the piezoelectric material 20 is mainly observed, or the color of the first electrode 2 transmitted through the piezoelectric material 20 is observed. For example, if the piezoelectric material 20 is white, a white display will results.

On the other hand, if an electric field directed from the second electrode 12 toward the first electrode 2 is produced, the first electrode 2 becomes a positive electrode whereas the second electrode 12 becomes a negative electrode. At this time, the negatively charged black particles 5B travel to the first electrode 2 side and adhere to the surface of the piezoelectric material 20 disposed above the first electrode 2. Accordingly, as seen in the pixel 100b and a pixel 100c, when observed from the upper substrate 16 side, which is the viewing side, the color of the black particles 5B is mainly observed, resulting in a black display.

When rewriting images in the display element of the present embodiment, a high-frequency sine wave voltage is applied between the first and second electrodes 2 and 12 at first. By this voltage application, piezoelectric effect is caused by the piezoelectric material 20 disposed between the first and second electrodes 2 and 12, and thereby vibration is generated by the vibration-generating portion 21. By transmission of the this vibration to the black particles 5B, aggregated black particles 5B are dissociated, and the black particles 5B that have adhered to the surface of the second electrode 12 and the surface of the piezoelectric material 20 are detached therefrom. Then, the dissociated and detached black particles 5B are dispersed in the space 17 uniformly. Thus, by using the vibration generated by the vibration-generating portion 21, an image is erased. Subsequently, an image signal voltage corresponding to a new image is applied to the first and second electrodes 2 and 12, and in response to this, the foregoing display operation is performed to rewrite the image.

As described above, in the present embodiment thus configured, dissociation of aggregated particles and detachment of particles from the adhering surface can be performed by generating vibration with the vibration-generating portion 21, and therefore, similar advantageous effects to those of the first preferred embodiment can be obtained. Moreover, since the same electrodes are used for the display operation and for generating vibration, cost reduction is achieved and thickness reduction and weight reduction of the device is attained. Furthermore, since the piezoelectric material 20 is directly in contact with the space 17 in this case, the vibration transmitted from the piezoelectric material 20 to the black particles 5B is stronger. Therefore, the dissociation effect of the aggregated particles and the detachment effect from the adhering surfaces are greater, and thus, the operating voltage for generating vibration can be reduced.

Figure 9:
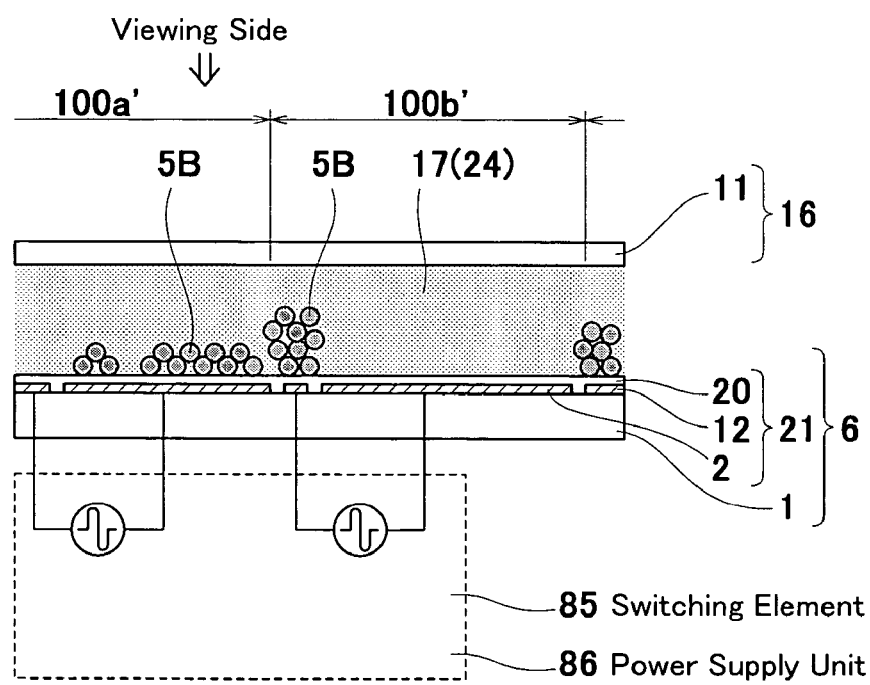
FIG. 9 is a schematic cross-sectional view showing the configuration of a pixel, which is a constitutional unit, of a display element according to a variation of the seventh preferred embodiment of the present invention.

Further, as a variation of the present embodiment, it is possible to employ a configuration in which the first and second electrodes 2 and 12 are provided at intervals on the first substrate 1 in a comb-tooth shape, as shown in FIG. 9. In such a configuration, the first electrode 2 and the second electrode 12 are insulated from each other, and therefore, when a voltage is applied between the first and second electrodes 2 and 12, an electric field is produced between the first and second electrodes 2 and 12.

In this example, if a DC voltage, which is the image signal voltage, is applied between the first and second electrodes 2 and 12, by this voltage application the black particles 5B travel according to their charging characteristics due to the electric field produced between the first and second electrodes 2 and 12. In the case where the first electrode 2 becomes a negative electrode and the second electrode 12 becomes a positive electrode, the negatively charged black particles 5B travel to a region above the second electrode 12 and adhere to the surface of the piezoelectric material 20 disposed above the second electrode 12 as seen in pixel 100b'. Accordingly, when observed from the viewing side, which the upper substrate 16 side, the color of the piezoelectric material 20 above the first electrode 2, or the color of the first electrode 2 underneath, which transmits through the piezoelectric material 20, is mainly observed. For example, when the piezoelectric material 20 is white, a white display results. On the other hand, when the first electrode 2 becomes a positive electrode whereas the second electrode 12 becomes a negative electrode, as seen in pixel 100a', the negatively charged black particles 5B travel in a region above the first electrode 2 and adhere to the surface of the piezoelectric material 20 disposed above the first electrode 2. Accordingly, when observed from the upper substrate 16 side, which is the viewing side, the color of the black particles 5B is mainly observed, and a black display results.

When rewriting images, a high-frequency sine wave voltage is applied at first between the first and second electrodes 2 and 12 and vibration is generated with the vibration-generating portion 21 as described above, to erase an image, and thereafter, the above-described display operation is performed. Therefore, this example too attains similar advantageous effects to those of the first preferred embodiment.

It should be noted that although the foregoing discussed a case in which the space 17 is in a liquid phase, the space 17 may be in a gas phase in the configuration of the present embodiment in which electrodes for display operations are provided on the same substrate side. In addition, it is possible to adopt a configuration in which a partition wall is provided for each pixel 100.

Eighth Preferred Embodiment

Figure 10:
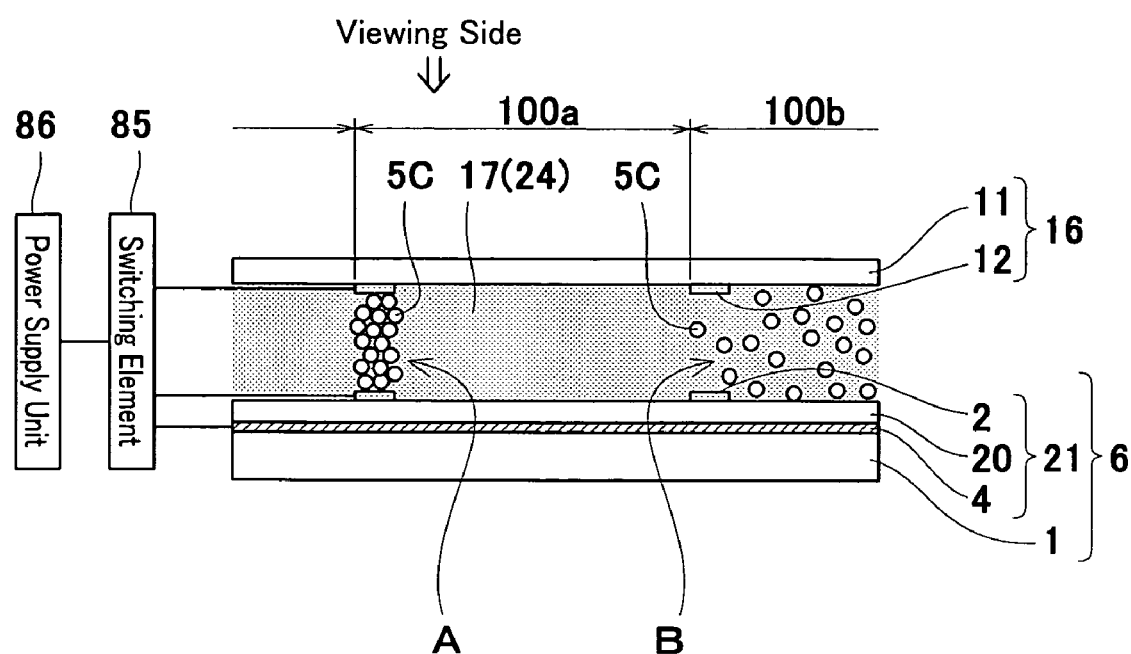
FIG. 10 is a schematic cross-sectional view showing the configuration of a pixel, which is a constitutional unit, of a display element according to an eighth preferred embodiment of the present invention.

FIG. 10 is a schematic cross-sectional view showing the configuration of a pixel that constitutes a display element of a display device according to an eighth preferred embodiment of the present invention.

As shown in FIG. 10, in the present embodiment, a rectangular-shaped second electrode 12 is formed on the first substrate 11 of the upper substrate 16 for each pixel 100, and corresponding to the location of the second electrode 12, a rectangular-shaped first electrode 2 is formed on the piezoelectric material 20 of the lower substrate 16. In addition, although not shown in the figure, the display element of the present embodiment is of an active matrix drive type, and a thin film transistor (TFT) serving as a switching element is provided on the lower substrate 6 for each pixel 100. In this way, voltage applications to each pixel 100 are made possible.

Electric field-aligned particles 5C are contained in the space 17 filled with an insulative solvent 24. Herein, the electric field-aligned particles 5C are particles composed of a material that has a high dielectric constant and is easily polarized, such as composite particles in which silica is coated on the circumferences of acryl-based polymer core particles. In this embodiment, the electric field-aligned particles 5C are polarized by an electric field produced between the first and the second electrodes 2 and 12. The electric field-aligned particles 5C have a configuration such as to scatter the light incident from the upper substrate 16 side to irregularly reflect it.

The display element thus configured performs a display operation in which the electric field-aligned particles 5C are aligned between the first and second electrodes 2 and 12 (the state indicated by the arrow A in the figure), and a display operation produced by a state in which the electric field-aligned particles 5C are dispersed in the space 17 (the state indicated by the arrow B in the figure).

Specifically, when a voltage corresponding to a image signal is applied and an electric field is thereby produced between the first and second electrodes 2 and 12, the electric field-aligned particles 5C are polarized by the electric field. The electric field-aligned particles 5C thus polarized causes attractive forces between the particles depending on their positional relationship. As a result, the electric field-aligned particles 5C that have been dispersed in the space 17 are aligned between the first and second electrodes 2 and 12 along the electric field (the state A in the figure). In this state, as seen in pixel 100a, the color of the piezoelectric material 20 is observed, or the color of the third electrode 4 underneath or the color of the first substrate 1 further underneath, transmitting through the piezoelectric material 20, is observed. Accordingly, the display is performed with these colors. The state of the particles thus aligned is retained even after the voltage application to the first and second electrodes 2 and 12 is stopped and the electric field is removed.

In rewriting the display images in which the electric field-aligned particles 5C are aligned, a high-frequency sine wave voltage is applied between the first and third electrodes 2 and 4 at first. Consequently, piezoelectric effect is caused in the piezoelectric material 20, generating vibration in the vibration-generating portion 21, and the vibration is transmitted to the aligned electric field-aligned particles 5C. If a vibrational energy greater than the interaction force between the particles is imparted, the attractive force between the aligned electric field-aligned particles 5C is cancelled. As a result, as seen in pixel 100b, the alignment state of the electric field-aligned particles 5C is disturbed, and the electric field-aligned particles 5C are dispersed in the space 17 (the state B in the figure). In this state, the light entering from the upper substrate 16 side into the display element is scattered and reflected by the electric field-aligned particles 5C, and consequently, the display appears to be white due to the reflected light when observed from the upper substrate 16 side.

The display element of the present embodiment is configured such that the voltage application to the first and second electrodes 2 and 12 and the voltage application to the first and third electrodes 2 and 4 can be carried out for each one of the pixels 100, and therefore, the distribution state of the electric field-aligned particles 5C in the space 17 can be controlled for each pixel 100 to perform a desired display. Thus, the display element can display desired images.

It should be noted that although the foregoing has discussed a case in which the space 17 is in a liquid phase, the space 17 may be in a gas phase in the configuration of the present embodiment. It is also possible to employ a configuration in which the partition wall is provided for each pixel 100.

Ninth Preferred Embodiment

Figure 11A:
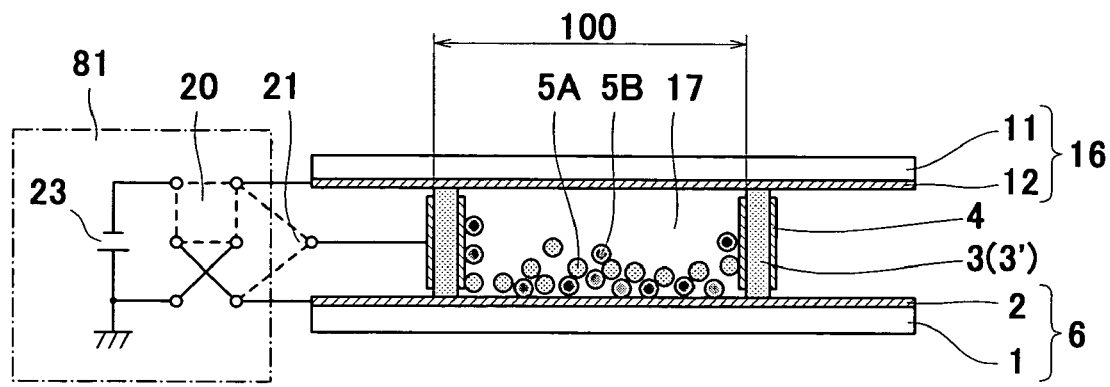
FIGS. 11A and 11B are schematic cross-sectional views showing the configuration of a pixel, which is a constitutional unit, of a display element according to a ninth preferred embodiment of the present invention, FIG. 11A showing a vertical cross section of the display element and FIG. 11B showing a horizontal cross section thereof.
Figure 11B:
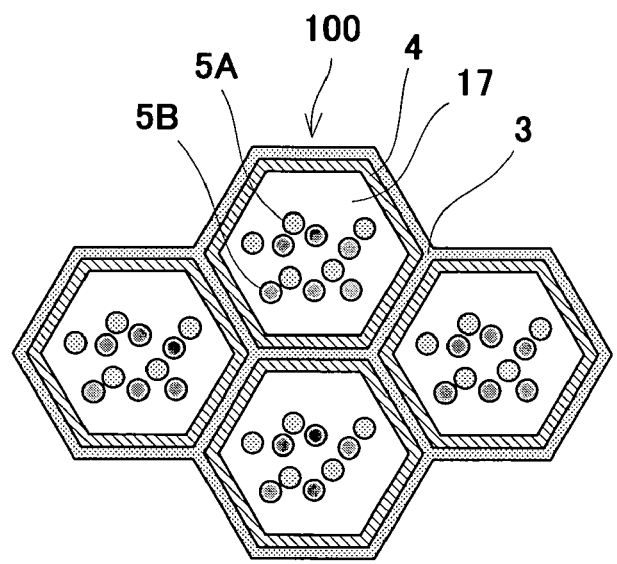

FIGS. 11A and 11B show schematic views depicting a pixel that constitutes a display element of a display device according to a ninth preferred embodiment of the present invention, wherein FIG. 11A shows a cross section that is perpendicular to its display screen (i.e., a vertical cross section) and FIG. 11B shows a cross section that is parallel to the display screen (hereafter referred to as a "horizontal cross section").

As shown in FIGS. 11A and 11B, in the display element of the present embodiment, a space 17 is formed between an upper substrate 16 and a lower substrate 6 supported by a spacer 3' (which corresponds to the partition wall 3), and black particles 5B and white particles 5A are contained in the space 17, as in the display element of the first preferred embodiment. In this embodiment, the lower substrate 6 has a configuration in which a first electrode 2 is formed on a first substrate 1. A third electrode 4 is provided on a surface of the partition wall 3 constituted by the spacer 3'. The third electrode 4 is provided so that it does not come in direct contact with the first and second electrodes 2 and 12 but is separated from them by gaps, and thus, the third electrode 4 is insulated from the first and second electrodes 2 and 12. It should be noted that although the gaps between the third electrode 4 and the first and second electrodes 2, 12 are exaggerated in the figure, the gaps may be very small.

In the horizontal cross section of the display element, the partition wall 3 has a network-like structure that have a plurality of hexagonal holes, as shown in FIG. 11B, and each of the holes corresponds to a region for each pixel 100. The third electrode 4 is provided along the surfaces of the holes on the partition wall 3. Accordingly, the outer periphery of each pixel 100 is surrounded by the partition wall 3 and the third electrode 4 provided on the surface thereof. In this embodiment, the third electrode 4 of each pixel 100 is connected to a common line (not shown). By forming each pixel 100 into a hexagonal shape, it is possible to realize a display device that is very robust against the pressure applied from the front of the display screen and to achieve improvement in pixel density. A plurality of black particles 5B and a plurality of white particles 5A are contained in the space 17 that is partitioned for each pixel 100. The first electrode 2 and the second electrode 12 are connected to a DC power supply 23 via a switching element 20 that allows switching of the voltage application path. The third electrode 4 is connected to the DC power supply 23 that is common with the first and second electrodes 2 and 12, via a switching element 21 that permits the voltage application path to be switchable. In this embodiment, the second electrode driver 81 (see FIG. 1) has the DC power supply 23 and the switching elements 20 and 21, and the switching elements 20 and 21 are switched according to image signals.

Next, the following describes a method of manufacturing the display element having the above-described configuration. Here, 1.1 mm thick glass substrates are used as the first and second substrates 1 and 11. On the first substrate 1, a transparent and conductive ITO (Indium Tin Oxide) film is deposited to form the first electrode 2. Thus, a lower substrate 6 is formed. Likewise, on the second substrate 11, an ITO film is deposited to form the second electrode 12. Thus, an upper substrate 16 is formed.

Subsequently, a partition wall 3 is provided on the surface of the lower substrate 6 thus formed or on the surface of the upper substrate 16 thus formed. Herein, a network-like sheet serving as the partition wall 3, which is composed of insulative polyethylene terephthalate (PET) and has a plurality of hexagonal holes, is provided, for example, on the first electrode 2 of the lower substrate 6. The thickness of the sheet is 110 μm. Then, an electrode material having conductivity such as aluminum is deposited and patterned so as to cover the surfaces of the holes of the partition wall 3 by vacuum deposition or the like, to form a third electrode 4. Here, as described previously, it is necessary that gaps are formed between the third electrode 4 and the first and second electrodes 2 and 12 when the lower substrate 6 and the upper substrate 16 are put together. For this reason, the third electrode 4 is formed on the partition wall 3 except predetermined regions at its upper and lower ends. Each of the regions upper the first substrate 1 that are partitioned by the partition wall 3 corresponds to one pixel region. That is, each pixel 100 has a hexagonal shape, and its width (the distance between a pair of opposing apex angles) is about 10 μm.

A plurality of black particles 5B and a plurality of white particles 5A are contained in the space 17 partitioned by the partition wall 3 on the first electrode 2, that is, in the space 17 of each one of the pixels 100. Herein, a negatively charged, insulative polymerized toner is used as the black particles 5B. For the white particles 5A, uncharged, insulative particles (for example, Techpolymer manufactured by Sekisui Plastics Co., Ltd.: 20 μm) are used. These black and white particles 5B and 5A are, as described above, porous composite particles. For the pixels 100, 2 mg of the black particles 5B and 2 mg of the white particles 5A that are mixed on wrapping paper or the like uniformly and evenly are sieved and sprinkled in the space 17. At this time, the first substrate 1 is microscopically vibrated to spread the particles 5A and 5B uniformly over the substrate surface. Then, the lower substrate 6 and the upper substrate 16 are bonded and fastened together with an adhesive or the like. Thereafter, the first, second and third electrodes 2, 12, and 4 are connected to the DC power supply 23, and the voltage application path is arranged.

Thereafter, in order to disperse the black and white particles 5B and 5A over the substrate surface uniformly, a rectangular wave AC voltage is applied between the first electrode 2 and the second electrode 12, and an alternating electric field is produced in the space 17. Such a voltage application is performed, for example, immediately before shipping the final product of the display device. The amplitude of the AC voltage to be applied is about plus or minus 150 V, and the frequency is 3-1000 Hz. Herein, the lower the frequency is, the longer the time for which the black and white particles 5B and 5A takes to spread over the substrate surface uniformly. On the other hand, if the frequency is high, the particles 5A and 5B are quickly dispersed uniformly, but when a voltage is further applied after they are dispersed uniformly, the particles collide or make contact with each other, forming aggregation of the particles, and the dispersion becomes non-uniform. For this reason, it is preferable that the frequency of the AC voltage to be applied should be particularly about 3 to 10 Hz, by which the white and black particles 5A and 5B can be dispersed uniformly and evenly over the substrate surface of each pixel 100. This leads to prevention of the occurrence of luminance unevenness. It should be noted that, as described previously, once such a voltage application is carried out to disperse the particles 5A and 5B uniformly, for example, before shipping the display device, the effect is retained from then on.

Next, the display operation in the display element is described, bringing the focus on one pixel 100, which is a constitutional unit thereof. It should be noted that in each one of the plurality of pixels 100, the operation described below is carried out individually to display images.

Figure 12A:
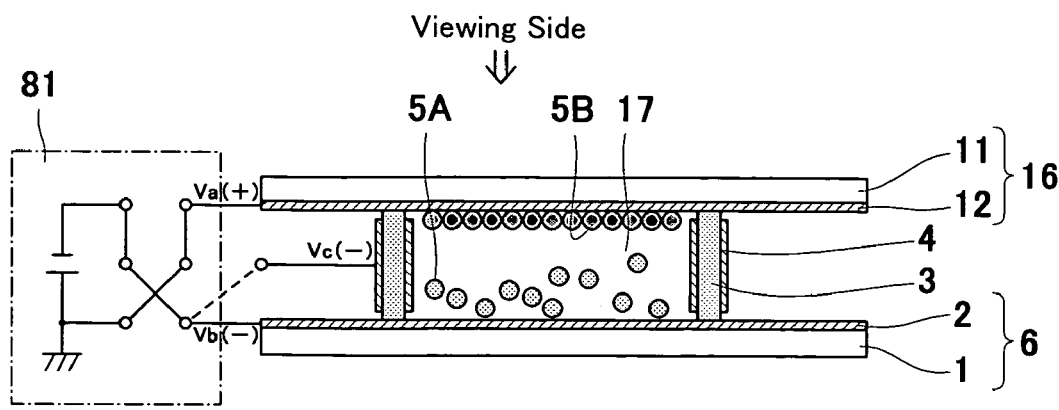
FIGS. 12A and 12B are schematic cross-sectional views showing the display operation of the pixel shown in FIG. 11, FIG. 12A depicting the operation in the black display and FIG. 12B depicting the operation in the white display.
Figure 12B:
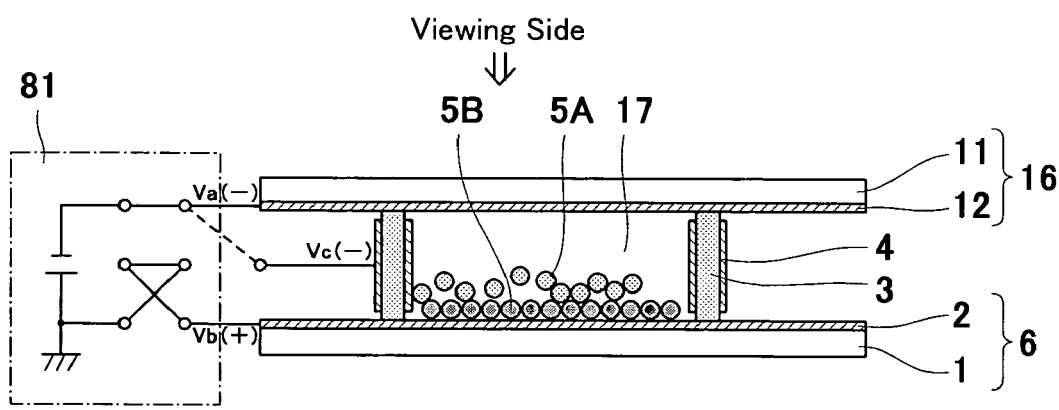
Figure 13A:
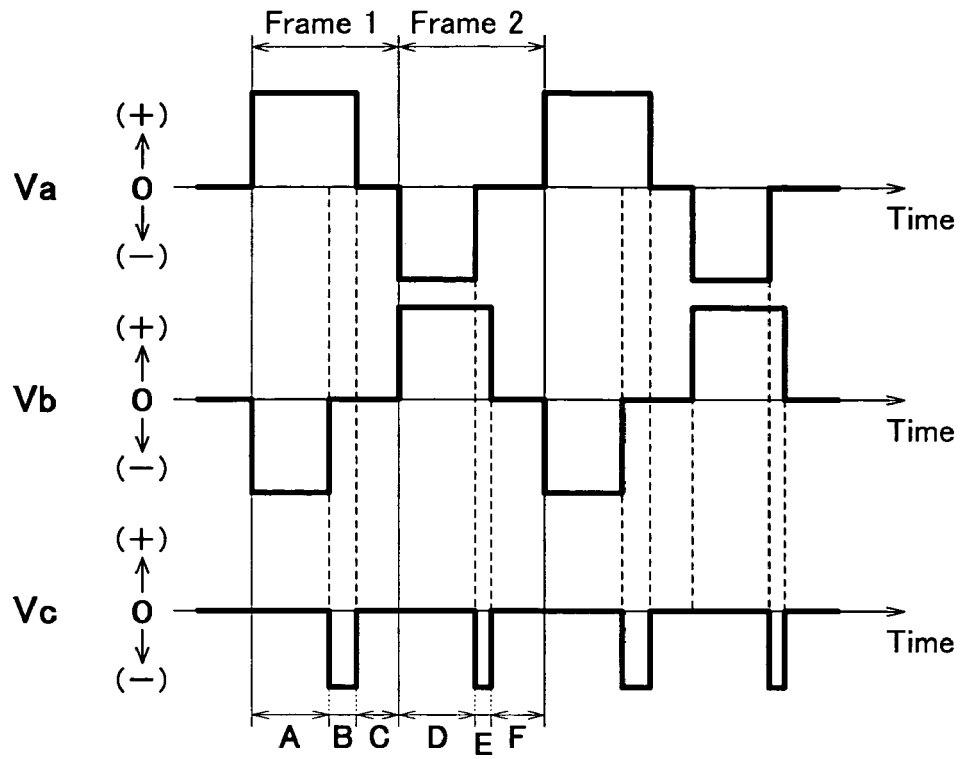
FIGS. 13A and 13B are charts schematically showing applied voltages during the display operation of the pixel shown in FIG. 11, FIG. 13A depicting a case where applying only DC voltage and FIG. 13B depicting a case where a direct current and an alternating current are superimposed.

FIGS. 12A and 12B are schematic cross-sectional views for illustrating the display operations in a pixel 100, wherein FIG. 12A shows a display operation in the black display state and FIG. 12B shows a display operation in the white display state. FIG. 13A is a schematic waveform chart depicting signal voltages applied to the first, second and third electrode 2, 12, and 4 in the display operations, wherein frame 1 shows signal voltages during the black display state and frame 2 shows signal voltages during the white display state. Herein, the potential of the first electrode is denoted as Vb, the potential of the second electrode as Va, and the potential of the third electrode as Vc.

As seen in frame 1 shown in FIGS. 12A and 13A, in the black display operation, a signal voltage corresponding to an image signal is applied between the first electrode 2 and the second electrode 12 at first. Here, the voltage application path is switched by the switching element 20 so that the potential Vb of the first electrode 2 becomes negative while the potential Va of the second electrode 12 becomes positive. In addition, switching of the switching element 21 is carried out so that no voltage is applied to the third electrode 4, and thus the potential Vc of the third electrode 4 is 0 (Period A). With such a voltage application, an electric field obtained by a voltage (Va-Vb) is produced between the electrodes 2 and 12. Here, since (Va-Vb) is positive, an electric field directed from the lower substrate 6 toward the upper substrate 16 side is produced, and the first electrode 2 becomes a negative electrode whereas the second electrode 12 becomes a positive electrode. Accordingly, the negatively charged black particles 5B travel toward the second electrode 12, which is a positive electrode, and adhere to the electrode surface. Thereby, when observed from the upper substrate 16 side, the white particles 5A not charged and thereby floating in the space 17 are covered behind the black particles 5B.

Here, when the black particles 5B travel, the black particles 5B adhere to the partition wall 3 covered by the third electrode 4 due to image forces or the like. In addition, aggregation of black particles 5B occurs in the vicinity of the partition wall 3. If the black particles 5B adhere to the partition wall 3 or aggregate in the vicinity thereof, gaps are created in the region covered by the black particles 5B because the number of the black particles 5B adhering to the second electrode 12 decreases, the white particles 5A are observed through the gaps. Consequently, luminance unevenness occurs and contrast degrades in such a condition. In order to prevent the occurrence of such luminance unevenness, the black particles 5B adhering to the partition wall 3 and aggregating in the vicinity are detached from the partition wall 3 and are caused to travel to the second electrode 12 side in the following manner.

Specifically, a signal voltage for causing the black particles 5B to travel in the above-described manner is applied between the first and second electrodes 2 and 12, and thereafter, the switching element 21 is switched so that the third electrode 4 is connected to the DC power supply 23 in place of the first electrode 2 (herein, connected to the voltage application path of the first electrode 2). Accordingly, a voltage is applied between the second electrode 12 and the third electrode 4, thereby turning the potential Vb of the first electrode 2 to 0, the potential Va of the second electrode 12 to positive, and the potential Vc of the third electrode 4 negative. Thus, with such a voltage application, an electric field obtained by a voltage (Va-Vc) is produced between the electrodes 12 and 4. Herein, since (Va-Vc) is positive, an electric field directed from the third electrode 4 side toward the second electrode 12 side is produced, turning the second electrode 12 to a positive electrode and the third electrode 4 to a negative electrode (Period B). By making the third electrode 4 provided on the partition wall 3 have the same polarity as that of the adhering black particles 5B in this way, the black particles 5B adhering to the third electrode 4 and aggregating in the vicinity thereof repel with the electrode 4 due to Coulomb forces, and consequently, they come apart from the partition wall 3 and travel toward the second electrode 12. Then, the particles 5B that have traveld adhere to the surface of the second electrode 12, covering the white particles 5A underneath and contributing to the display operation. Thus, by applying a voltage between the second electrode 12 and the third electrode 4 to and removing the black particles 5B from the partition wall 3, it is made possible to utilize the black particles 5B for the display operation effectively, and to prevent the white particles 5A from being observed through the gaps between the black particles 5B. Therefore, it becomes possible to suppress luminance unevenness and to achieve high contrast.

After applying a voltage between the second electrode 12 and the third electrode 4 as described above, voltage application is stopped, resulting in no voltage state. That is, the potentials Vb, Va, and Vc of the first, second, and third electrode 2, 12, and 4 become 0 (Period C). Even in such no voltage state, adherence of the black particles 5B to the second electrode 12 is maintained due to adhesive forces such as image forces and van der Waals forces between the particles and between the particles and the electrode 12. Therefore, the black display is retained.

Subsequently, the black display is rewritten into a white display. When rewriting into the white display, as seen in frame 2 shown in FIGS. 12B and 13A, a signal voltage corresponding to an image signal is applied between the first electrode 2 and the second electrode 12 at first. Herein, the voltage application path is switched by the switching element 20 so that, in contrast to the case of the above-described black display, the potential Vb of the first electrode 2 becomes positive and the potential Va of the second electrode 12 becomes negative. Also herein, switching of the switching element 21 is carried out so that no voltage is applied to the third electrode 4, and thus, the potential Vc of the third electrode 4 is 0 (Period D). With such a voltage application, an electric field obtained by a voltage (Va-Vb) is produced between the electrodes 2 and 12. Herein, since (Va-Vb) is negative, an electric field directed from the upper substrate 16 side toward the lower substrate 6 side is produced, turning the first electrode 2 to a positive electrode and the second electrode 12 to a negative electrode. Accordingly, the negatively charged black particles 5B travel toward the first electrode 2, which is a positive electrode, and they move under the white particles 5A and adhere to the electrode surface. Consequently, when observed from the upper substrate 16 side, the black particles 5B are covered with the white particles 5A, resulting in white display.

Here, when the black particles 5B travel, the black particles 5B adhere to the partition wall 3 covered by the third electrode 4 due to image forces or the like, as in the case of the above-described black display. In addition, aggregation of the black particles 5B occurs in the vicinity of the partition wall 3. If the black particles 5B adhere to the partition wall 3 or aggregate in the vicinity thereof, these black particles 5B are observed when viewed from the upper substrate 16 side. Consequently, luminance unevenness occurs and contrast degrades. In order to prevent the occurrence of such luminance unevenness, the black particles 5B adhering to the partition wall 3 and aggregating in the vicinity are detached from the partition wall 3 and are caused to travel to the first electrode 2 side in the following manner.

That is, after a signal voltage for causing the black particles 5B to travel is applied between the first and second electrodes 2 and 12 as described above, the switching element 21 is switched so that the third electrode 4 is connected to the DC power supply 23 in place of the second electrode 12 (herein, the third electrode 4 is connected to the voltage application path of the second electrode). Accordingly, a voltage is applied between the first electrode 2 and the third electrode 4, thereby turning the potential Vb of the first electrode 2 to positive, the potential Va of the second electrode 12 to 0, and the potential Vc of the third electrode 4 to negative (Period E). Thus, with such a voltage application, an electric field obtained by a voltage (Vb-Vc) is produced between the electrodes 2 and 4. Herein, since (Vb-Vc) is positive, an electric field directed from the third electrode 4 side toward the first electrode 2 side is produced, turning the first electrode 2 to a positive electrode and the third electrode 4 to a negative electrode. By making the third electrode 4 provided on the partition wall 3 have the same polarity as that of the adhering black particles 5B in this way, the black particles 5B adhering to the third electrode 4 and aggregating in the vicinity thereof repel with the electrode 4 due to Coulomb forces, and consequently, they come apart from the partition wall 3 and travel toward the first electrode 2. Then, the particles 5B that have traveld move underneath the white particles 5A, adhering to the surface of the first electrode 2. Thus, by applying a voltage between the first electrode 2 and the third electrode 4 and removing the black particles 5B from the partition wall 3, it is made possible to prevent the black particles 5B from being observed. Therefore, it becomes possible to suppress luminance unevenness and to achieve high contrast.

After applying a voltage between the first electrode 2 and the third electrode 4 as described above, voltage application is stopped, resulting in no voltage state. That is, the potentials Vb, Va, and Vc of the first, second, and third electrode 2, 12, and 4 become 0 (Period F). Even in such no voltage state, adherence of the black particles 5B to the first electrode 2 is maintained due to adhesive forces such as image forces and van der Waals forces between the particles and between the particles and the electrode 2. Therefore, the white display is retained.

In the display device of the present embodiment, the black display operation and the white display operation as described above are repeatedly performed according to image signals, and the display images are rewritten. In the display device of the present embodiment thus configured, as in the first preferred embodiment the occurrence of luminance unevenness and contrast degradation are prevented, thereby good display characteristics can be realized, and the operating voltage is reduced. Specifically, by removing from the partition wall 3 the black particles 5B, good display in which luminance unevenness is suppressed is made possible, and reduction in the operating voltage is achieved. In addition, by applying an alternating voltage between the first and second electrodes 2 and 12 in manufacturing the display device as described above, the black and white particles 5B and 5A can be dispersed in the pixel 100 uniformly, and therefore, luminance unevenness can be further reduced.

Moreover, this display device can be easily manufactured since it can be realized merely by providing the third electrode 4 on the partition wall 3 and configuring the wiring arrangement such that the electrode 4 is connected to the DC power supply 23 connected to the first and second electrodes 2 and 12. Furthermore, because of the use of the common DC power supply 23, space saving is achieved and, the applied voltage to the first and second electrodes 2 and 12 can be applied also to the third electrode 4 by switching of the voltage application path, power consumption of the device can be reduced.

Figure 13B:
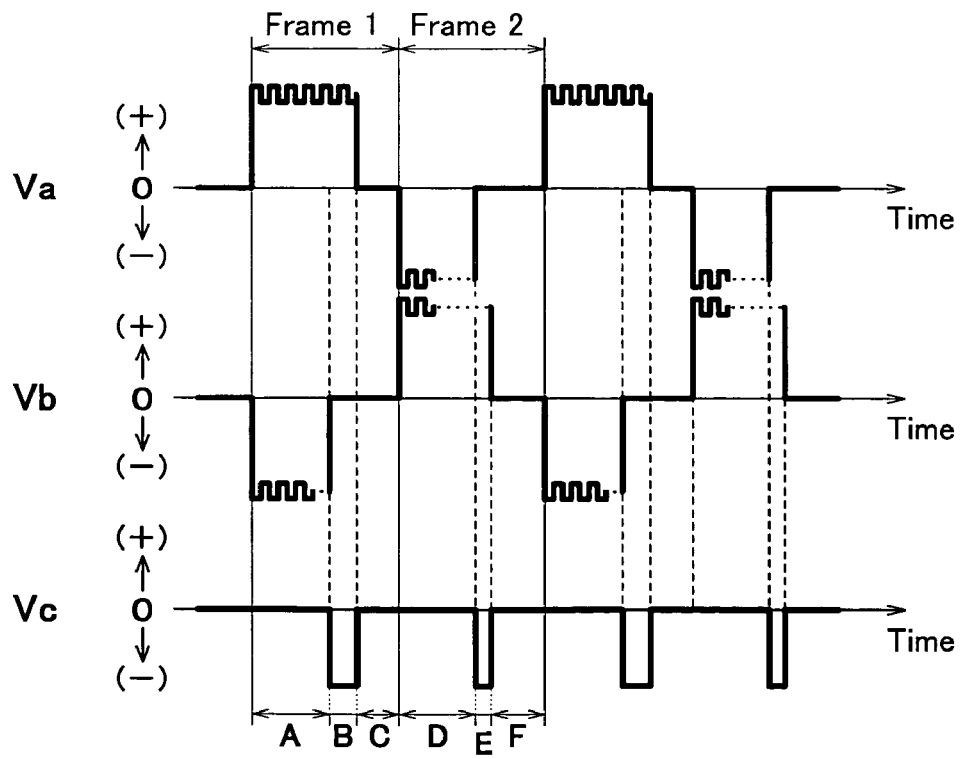

Although the foregoing has discussed a case in which a DC voltage is used for both the voltage applied for causing the particles that directly contribute to the display operation to travel and the voltage applied for removing the particles from the partition wall as shown in FIG. 13A, it is more preferable that at least one of the two applied voltages for the above-described is a voltage obtained by superimposing a rectangular wave AC voltage on a DC voltage, the AC voltage having a smaller amplitude than that of the DC voltage, as shown in FIG. 13B. By applying the voltage on which an AC voltage is superimposed, a microscopic vibration motion can be caused for the particles adhering to the partition wall or the electrodes due to the AC voltage, and with the motion, adhesive forces of the particles can be weakened. If a DC voltage is applied in such a condition, the particles whose adhesive forces have been weakened can be easily detached and caused to travel to the opposite polarity. For this reason, the DC voltage applied for causing the particles to travel is lower than the DC voltage that is required when an AC voltage is not superimposed. As a result, it becomes possible to reduce the overall operating voltage. For example, referring to FIG. 13B, the signal voltage (Period A and Period D) applied to the first and second electrodes 2 and 12 during the black display may be comprised of a DC voltage component having an amplitude of 150 V and a rectangular wave AC voltage component having an amplitude of 30-70 V, for example, of about 50 V. In this case, the frequency of the AC voltage component is typically 100 Hz or higher. The optimum value of the frequency is determined from the proportion of the DC voltage component and the AC voltage component.

As a variation of the present embodiment, an insulating layer may be formed between the third electrode and the first and second electrodes. An example of a method of forming the insulating layer is as follows; a mixture in which 10 wt. % of a polycarbonate resin (bisphenol-Z polycarbonate Z200 manufactured by Mitsubishi Gas Chemical Company, Inc.) is mixed with tetrahydrofuran (THF) is formed into a film on the first and second electrodes by spin-coating to have a film thickness of about 2-3 µm. It should be noted that when the insulating layer is formed, the third electrode can cover the entire partition wall including its upper and lower ends and come in direct contact with the insulating layer.

Tenth Preferred Embodiment

Figure 14:
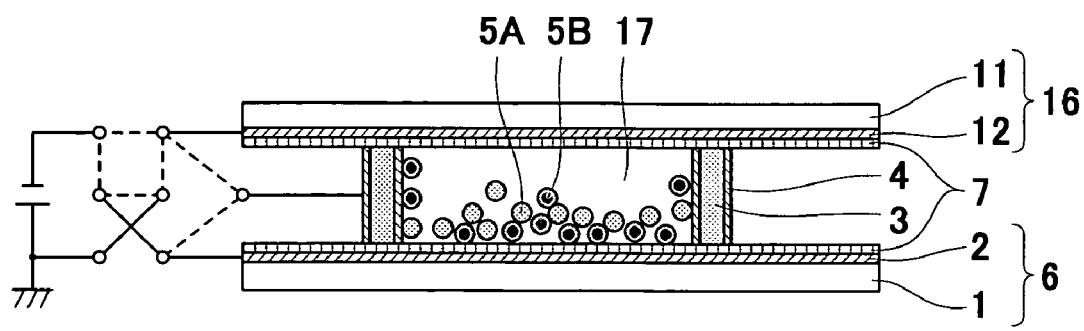
FIG. 14 is a schematic cross-sectional view showing the configuration of a pixel that constitutes a display element for a display device according to a tenth preferred embodiment of the present invention.

FIG. 14 is a schematic cross-sectional view showing the configuration of a pixel that constitutes a display element of a display device according to a tenth preferred embodiment of the present invention. As shown in FIG. 14, the pixel of the present embodiment has a similar configuration to that of the ninth preferred embodiment but differs from the ninth preferred embodiment in the later-described points. The display operations in the present embodiment are similar to the display operations in the ninth preferred embodiment shown in FIGS. 12A and 12B. The voltages applied during the display operation are as shown in FIG. 13A or 13B, as in the ninth preferred embodiment.

In the present embodiment, the black particles 5B have conductivity, unlike the ninth preferred embodiment in which the black particles 5B are insulative. For this reason, as shown in FIG. 14, an electron transport layer 7 serving as a charge transport layer is formed on each of the first electrode 2 and the second electrode 12, as in the case of the second preferred embodiment. As previously described in the second preferred embodiment, in the present embodiment, in which the black particles 5B have conductivity, the black particles 5B repeat reciprocative vibrating motion between the first and second electrodes 2 and 12 while an alternating electric field is being generated unless the electron transport layer 7 is formed, and it is difficult to display an image. On the other hand, if insulating layers are formed on the first and second electrodes 2 and 12 in place of the electron transport layer 7, the insulating layers can prevent the black particles 5B from accepting electric charge (positive holes) from the first and second electrodes 2 and 12; in this case, however, the electric charge (electrons) only leaks from the black particles 5B and the black particles 5B do not receive electric charge from anywhere. As a result, the black particles 5B cannot travel, so the display operation cannot be performed.

In contrast, if the electron transport layers 7 are formed on the first and second electrodes 2 and 12, the electron transport layer 7 inhibits the passage of positive holes and allows only electrons to pass therethrough selectively when the black particles 5B adhere to the second electrode 12 with the electron transport layer 7 interposed therebetween, for example, in the black display state shown in FIG. 13A. Consequently, the transfer of positive holes from the second electrode 12 to the black particles 5B can be prevented, whereas the transfer of electrons from the second electrode 12 to the black particles 5B is made possible. Accordingly, the black particles 5B are not changed from the original polarity (negative polarity) to the opposite polarity (positive polarity) in this case, and the particles 5B, though having conductivity, are maintained to have a uniform amount of electrostatic charge and have a negative polarity; accordingly, they are retained on the second electrode 12 side, which is a positive electrode. Likewise, in the white display state shown in FIG. 13B, since the electron transport layer 7 is formed on the first electrode 2, positive holes are not transferred but only electrons are transferred from the first electrode 2, which is turned to a positive electrode, to the black particles 5B, as in the case of the black display state. Therefore, the black particles 5B are maintained to have a uniform amount of electrostatic charge and have a negative polarity, and accordingly, they are retained on the first electrode 2 side, which is a positive electrode. Thus, with the configuration of the present embodiment, in which the electron transport layers 7 are formed on the first and second electrodes 2 and 12, the reciprocative vibrating motion of the black particles 5B can be prevented, achieving a stable and good display operation, even when the black particles 5B have conductivity. Additionally, the present embodiment thus configured attains similar advantageous effects to those described in the ninth preferred embodiment.

Examples of the electron transport material that forms the electron transport layer 7 may include such compounds as a benzoquinone-based compound, a tetracyanoethylene-based compound, a tetracyanoquinodimethane-based compound, a fluorenone-based compound, a xanthone-based compound, a phenanthraquinone-based compound, a phthalic anhydride-based compound, or a diphenoquinone-based compound.

Eleventh Preferred Embodiment

Figure 15:
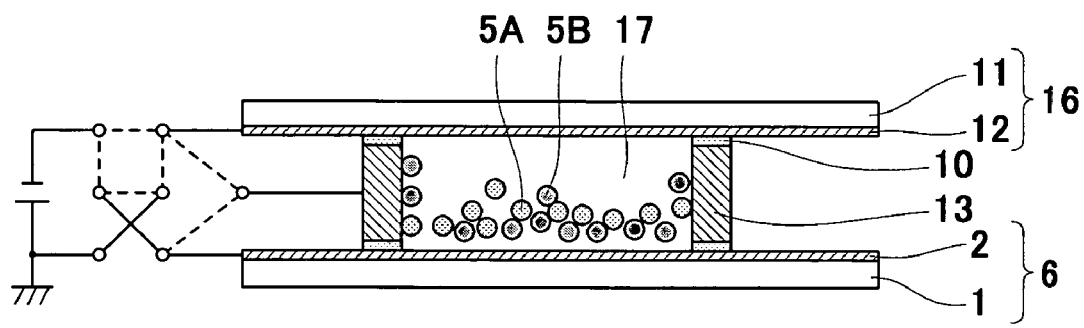
FIG. 15 is a schematic cross-sectional view showing the configuration of a pixel that constitutes a display element for a display device according to an eleventh preferred embodiment of the present invention.

FIG. 15 is a schematic cross-sectional view showing the configuration of a pixel that constitutes a display element of a display device according to an eleventh preferred embodiment of the present invention. As shown in FIG. 15, the pixel of the present embodiment has a similar configuration to that of the ninth preferred embodiment, but differs from the ninth preferred embodiment in the points described below. Also, the display operations in the present embodiment are similar to the display operations in the ninth preferred embodiment shown in FIG. 12A and FIG. 12B. The voltages applied during the display operation are as shown in FIG. 13A or 13B, as in the ninth preferred embodiment.

In the present embodiment, a partition wall 13 is composed of a conductive material unlike the ninth preferred embodiment, in which the partition wall 3 is composed of an insulating material. This embodiment adopts a configuration in which the partition wall 13 is composed of the same conductive material as that of the third electrode 4, and thus, the partition wall 13 also serves as the third electrode 4. Such a partition wall 13 is preferable to have flexibility in respect of flexural strength of the display device. In the configuration in which the partition wall 13 has conductivity, if the partition wall 13 comes in direct contact with the first and second electrodes 2 and 12, continuity is established between the electrodes and no electric field is generated; for this reason, insulating layers 10 are provided between the partition wall 13 and both electrodes 2 and 12 to ensure insulating performance.

The present embodiment thus configured attains similar advantageous effects to those described in the ninth preferred embodiment. Moreover, in this embodiment, since the partition wall and the third electrode are formed integrally, the manufacture becomes easier.

Twelfth Preferred Embodiment

Figure 16A:
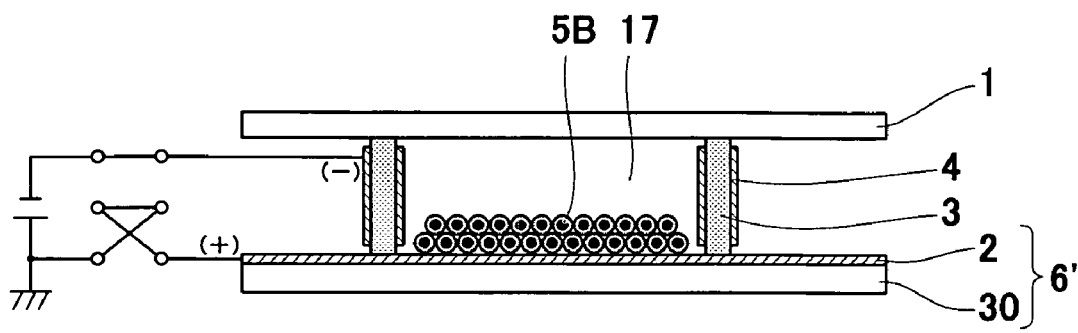
FIG. 16 is a schematic cross-sectional view showing the configuration of a pixel that constitutes a display element for a display device according to a twelfth preferred embodiment of the present invention.
Figure 16B:
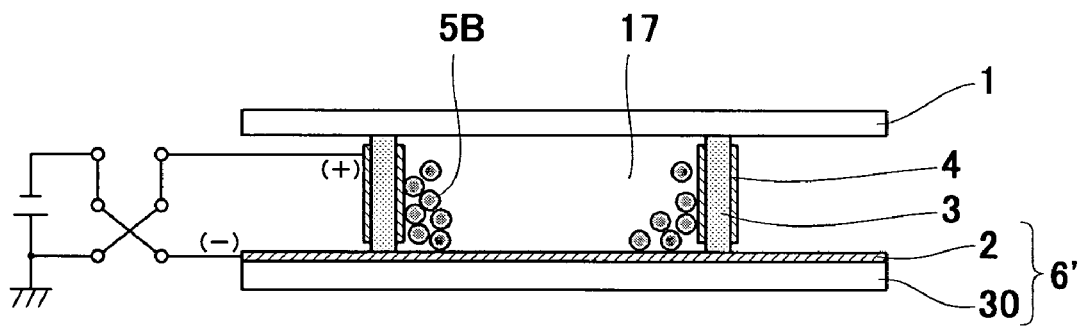
Figure 17:
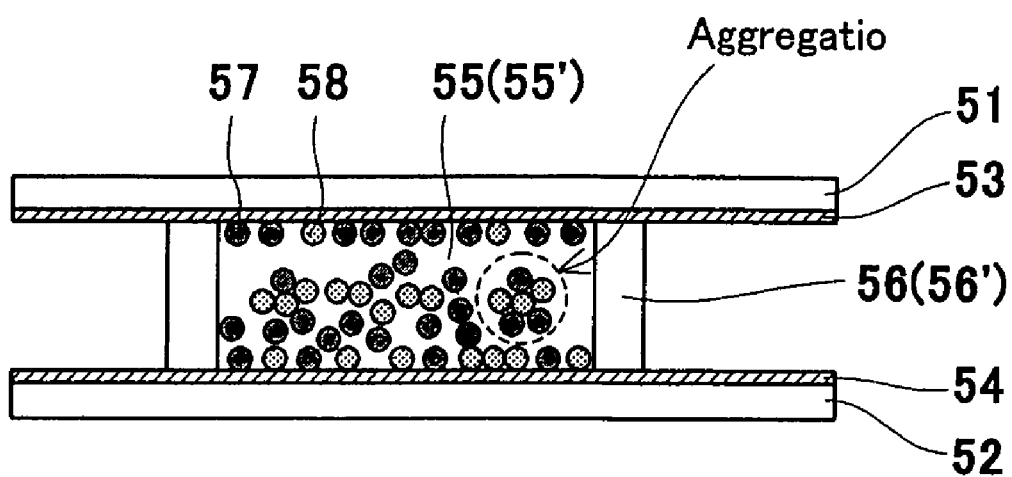
FIG. 17 is a schematic cross-sectional view showing the configuration of a pixel that constitutes a display element for a conventional display device.

FIGS. 16A and 16B are cross-sectional views schematically showing the configuration of a pixel that constitutes a display element of a display device according to a twelfth preferred embodiment of the present invention and the display operation thereof, FIG. 16A showing those in the black display state and FIG. 16B showing those in the white display state. In the present embodiment, the purpose of applying a voltage to the electrode 4 provided on the partition wall 3 is not to remove the black particles 5B adhering to the partition wall 3, but rather to cause the black particles 5B that contribute to a display operation to travel, as described below.

As shown in FIGS. 16A and 16B, the present embodiment uses a white plate for a first substrate 30 of a lower substrate 6'. The second electrode is not provided on the upper substrate side, and an alternating electric field is produced between the electrode 4 provided on the partition wall 3 and the electrode 2 provided on the lower substrate 6' side in this embodiment. Further, in this embodiment, one kind of colored particles, i.e., only the black particles 5B are contained in the space 17.

As shown in FIG. 16A, during the black display operation, a signal voltage corresponding to an image signal is applied between the electrode 2 on the lower substrate 6' side and the electrode 4 provided on the partition wall 3, whereby the electrode 2 becomes a positive electrode whereas the electrode 4 becomes a negative electrode. Accordingly, the negatively charged black particles 5B travel toward the electrode 2, which is a positive electrode, covering the surface thereof. When the surface of the electrode 2 is covered with the black particles 5B, the white plate (first substrate) 30 disposed below the electrode 2 goes out of view. Consequently, when observed from the upper substrate side, the color of the white plate 30 is not observed, resulting in black display caused by the black particles 5B.

On the other hand, during the white display operation, a voltage opposite to that in the black display is applied between the electrodes 2 and 4, turning the electrode 2 to a negative electrode and the electrode 4 to a positive electrode, as shown in FIG. 16B. As a result, the black particles 5B travel toward the electrode 4, covering the surface of the electrode 4. Then, with the traveling of the black particles 5B, the particles 5B that have adhered to the white plate 30 are removed, exposing the white plate 30. Accordingly, when observed from the upper substrate side, the color of the white plate 30, transmitting through the transparent electrode 2, is mainly observed, resulting in white display.

Here, the voltage applied between the electrode 2 and the electrode 4 may be a DC voltage of the ninth preferred embodiment as shown in FIG. 13A, but the voltage is preferable to be a voltage obtained by superimposing a rectangular wave AC voltage to a DC voltage as shown in FIG. 13B, in respect of reducing the operating voltage as previously described in the ninth preferred embodiment. In addition, in manufacturing the display element of the present embodiment, it is preferable that an AC voltage is applied between the electrode 2 and the electrode 4 after the black particles 5B are contained in the space 17 to generate an alternating electric field, as in the case of the ninth preferred embodiment. This makes it possible to disperse the black particles 5B in the space 17 uniformly, as in the case of the ninth preferred embodiment.

The present embodiment thus configured attains similar advantageous effects to those described in the ninth preferred embodiment. In addition, because the particles that travel in the space 17 are only one kind, namely the black particles 5B, the particles do not interfere with each other's traveling, therefore they do not collide one another or those with opposite polarities do not aggregate one another, unlike the case of using a plurality of kinds of particles in their traveling. For this reason, the black particles 5B can quickly travel. Consequently, this display device achieves improvement in the response speed and reduction in the operating voltage.

Although the foregoing has discussed a case where the first substrate 30 on the lower substrate 6' side is colored, the electrode 2 may be colored in place of the first substrate 30, or a colored layer may be provided separately.

In the foregoing the ninth to eleventh preferred embodiments, a voltage is applied between the first and second electrodes for the primary traveling of the particles that contribute to the display operation, and thereafter, a voltage is applied between the second and third electrodes for removing the particles adhered to the partition wall; however, it is possible to apply a voltage between the first and the third electrodes in advance and thereafter apply a voltage between the first and the second electrodes, or alternatively, the voltage application to the first and the second electrodes and the voltage application to the first and the third electrodes may be carried out simultaneously. In other words, the voltage application for the primary traveling of the particles and the voltage application for removing the particles from the partition wall may be carried out either in different timing or simultaneously. For example, if a voltage is applied between the first and third electrodes in advance, adherence of the particles to the partition wall can be prevented, and therefore, the advantageous effect can be obtained at a lower voltage than the case of detaching and removing the particles that have once adhered to the partition wall. In addition, although the foregoing preferred embodiments have described the cases where the voltage applied for the primary traveling of the particles and the voltage applied for removing the particles from the partition wall have the same amplitude, these two applied voltages may have different amplitudes. Further, the two voltages may be applied either for the same length of time or for different lengths of time.

The ninth to the twelfth preferred embodiments discussed the cases where the pixels have a hexagonal shape, but the shape of the pixels is not limited thereto. The pixels may have an ordinary rectangular shape.

Although the ninth to the twelfth preferred embodiments described the cases where the first electrode and the second electrode are opposed to each other with a space so that a vertical electric field is formed, both the first and second electrodes may be disposed on the same substrate side so that a transverse electric field is formed, as in the configuration of the seventh preferred embodiment.

Also, in the foregoing ninth to eleventh preferred embodiments, the particles to be charged are not limited to the black particles 5B, but the white particles 5A may be charged. In this case, due to the electric field produced, both particles travel in the space according their polarity, and the color of the particles that adhere to the second electrode disposed on the upper substrate side, which is a viewing side, determined the display color. For this reason, in order to prevent the particles that determine the desired display color from adhering to the partition wall, a voltage should be applied such that the third electrode provided on the partition wall has the opposite polarity to the second electrode.

In addition, although the foregoing ninth to eleventh preferred embodiments described the cases where the third electrode is connected to a common power supply to the first and second electrodes, the configuration may be such that it is connected to another power supply. Furthermore, the third electrode need not necessarily be connected to the first electrode or the second electrode.

In addition, although the foregoing ninth to twelfth preferred embodiments described the cases where the particles travel in a gas phase, the present invention may also be applied to display devices having a configuration in which the particles travel in a liquid phase, such as electrophoretic displays.

Furthermore, the foregoing ninth to twelfth preferred embodiments discussed a passive matrix drive type display devices, but the display devices may be an active matrix drive type. The active matrix drive type devices are suitable for the displays in which high speed response is required for displaying moving images or the like. On the other hand, the passive matrix drive type devices are suitable for the displays in which high speed response for displaying moving images or the like is not required, for example, paper-like displays for displaying newspapers or the like. Here, it has been difficult to adopt the passive matrix drive to conventional electrophoretic displays in which particles are caused to travel in a liquid phase because of the crosstalk voltage or the like which causes the particles to travel. However, if the configuration in which the particles are caused to travel in a gas phase such as described above is adopted, it can suppress the traveling of the particles caused by crosstalk voltage or the like and realize a passive matrix drive because the threshold voltage for causing the particles to travel is high. Further, unlike a active matrix drive type, it is unnecessary to form thin film transistors (TFT) as switching elements if a passive matrix drive is adopted, and therefore, it is possible to achieve reduction in manufacturing cost, reduction in lead time, improvement in the yield, and so forth.

The charging characteristics of the particles that contribute to the display operation are not limited to the foregoing first to twelfth preferred embodiments. For example, the foregoing ninth to the twelfth preferred embodiments discussed the cases where the black particles 5B are negatively charged, but the black particles 5B may be positively charged. In this case, the voltages of the opposite polarities to those of the foregoing operating voltages are applied to the electrodes 2, 12, and 4, and the potentials of the electrodes 2, 12, and 4 become opposite to those in the above-described case, thereby performing the above-described operation. Here, when the black particles 5B are positively charged and are conductive, it is necessary to provide hole transport layers on the surfaces of the electrodes to which the image signal voltage is applied. By providing the hole transport layers, the transfer of electrons from the electrodes to the black particles 5B is prevented but positive holes are transferred, and thus, it becomes possible to retain the positive charge of the black particles 5B.

Also, the foregoing first to twelfth preferred embodiments described the cases of black and white displays, but the present invention is applicable to color displays. For example, it is possible to adopt a configuration in which color display is achieved by providing a color filter on the upper substrate side. Further, by using two or more kinds of colored particles having different traveling characteristics depending on their colors and by varying the direction of the electric field to cause the particles to travel, it is possible to realize displays for displaying multi-colors corresponding to the number of kinds of colored particles. In addition, in the twelfth preferred embodiment, if the colored substrate of the lower substrate is colored with a plurality of kinds of colors, a multi-color display is also possible.

Furthermore, the foregoing first to twelfth preferred embodiments discussed the cases where the colored particles are porous and composite particles, but the configuration of the particles is not limited thereto, and even with the use of ordinary particles, the advantageous effects as those described above can be obtained. Moreover, it is preferable that the size of the particles are approximately the same in terms of reducing the operating voltage, but the particles don't necessarily have approximately the same size.

Further, although the foregoing first to twelfth preferred embodiments described the cases in which three electric field distributions are generated, namely, the electric field produced between the first and second electrodes, the electric field formed between the first and third electrodes, and the electric field generated between the second and the third electrode, it is possible to generate an electric field by combining those electric fields. Moreover, if, for example, the third electrode is provided separately, or the first and/or second electrode on the substrate is/are provided separately in a pixel; therefore, various kinds of electric fields can be generated.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A display device, including a pair of substrates opposed to each other and provided with electrodes, at least one of substrates is light-transmissive and at least one surface of the substrates is provided an electrode, a spacer disposed between the substrates for retaining a space having a desired width, and at least one kind of group of electrostatic particles contained in the space between the substrates, the device being configured to display an image corresponding to an image signal voltage applied to the electrode of the substrates by causing the group of particles to travel in the space between the substrates by an electric field produced by the image signal voltage, comprising:
   a vibration-generating portion provided so as to face a space in which the group of particles travel and configured to generate a mechanical vibration using at least a vibration material interposed between the electrode and one of the substrates having that electrode.

2. The display device according to claim 1, wherein the vibration-generating portion is provided on at least one of the substrates so as to face the space in which the group of particles travel.

3. The display device according to claim 1, wherein a first electrode and a second electrode to which the image signal voltage is applied are provided on one of the substrates.

4. The display device according to claim 1, wherein a first electrode is formed on one of the pair of substrates and a second electrode is formed on the other one of the pair of substrates, the image signal voltage is applied between the first ant the second electrodes.

5. The display device according to claim 1, wherein the vibration-generating portion includes electrodes and a vibration generator that generates vibration by an electric field formed by the electrodes, and at least one of the electrodes constitutes the electrode provided on the substrate.

6. The display device according to claim 1, wherein the vibration-generating portion includes electrodes and a vibration generator that generates vibration by an electric field formed by the electrodes, and the vibration-generating portion constitutes the spacer.

7. The display device according to claim 6, wherein an insulation medium is disposed between the electrodes of the vibration-generating portion and the electrodes provided on the substrate so that the vibration-generating portion is insulated from the electrodes of the substrate.

8. The display device according to claim 1, wherein the space in which the group of particles travel is a gas phase space.

9. The display device according to claim 1, wherein the space in which the group of particles travel is a liquid phase space filled with an insulative solvent.

10. The display device according to claim 9, wherein capsules each containing the group of particles and the insulative solvent are disposed in the space between the substrates.

11. The display device according to claim 9, wherein the particles composing the group of particles are aligned by an electric field applied between the electrodes of the substrates according to the image signal voltage.

12. The display device according to claim 11, wherein the group of particles are electric field-aligned particles aligning along the electric field.

13. The display device according to claim 1, wherein the group of particles are colored with at least one color.

14. The display device according to claim 1, wherein the vibration material is a piezoelectric material.

15. The display device according to claim 1, wherein the vibration-generating portion also serves as at least one of the substrates.

16. The display device according to claim 1, wherein:
   a display operation in the display device includes at least a first and a second display states;
   in the first display state, a first image signal voltage is applied to the electrodes provided on the substrates to form a first electric field;
   in the second display state, a second image signal voltage is applied to the electrodes provided on the substrates to form a second electric field having a different direction from that of the first electric field; and
   an application of a high-frequency sine wave to the vibration-generating portion and an application of the second image signal voltage to the electrodes provided on the substrates are carried out when performing rewriting from the first display state to the second display state.

17. The display device according to claim 16, wherein the application of the high-frequency sine wave voltage and the application of the second image signal voltage are carried out simultaneously.

18. The display device according to claim 16, wherein the application of the high-frequency sine wave voltage and the application of the second image signal voltage are carried out in different timing.

19. A display device for displaying an image corresponding to an image signal voltage applied between a pair of electrodes disposed in a space formed between a pair of opposing substrates, at least one of which is transparent, by causing at least one kind of plural charged colored particles internally existing in the space to travel between the electrodes by an electric field produced by the image signal voltage, comprising:
- a partition wall for partitioning the space into pixels;
- a substrate-side electrode connected to a voltage applying means and provided on an inner surface of at least one substrate for each of the pixels; and
- a partition wall-side electrode provided on the partition wall for each of the pixels and connected to the voltage applying means;
- wherein the image signal voltage is applied to at least the substrate-side electrode to perform a display operation.

20. The display device according to claim 19, wherein the space is a gas phase space.

21. The display device according to claim 19, wherein at least one of an electric field formed by applying a voltage to the substrate-side electrode or an electric field formed by applying a voltage to the partition wall-side electrode is an alternating electric field.

22. The display device according to claim 19, wherein:
- the substrate-side electrode includes a pair of electrodes disposed on at least one substrates;
- the substrate-side electrodes are connected to a first voltage applying means for applying the image signal voltage to the substrate-side electrodes; and
- the partition wall-side electrode is connected to a second voltage applying means for applying a voltage that forms an electric field for preventing the charged particles from adhering to the partition wall to the partition wall-side electrode.

23. The display device according to claim 22, wherein the first voltage applying means applies the image signal voltage to the substrate-side electrodes, and thereafter, the second voltage applying means applies the voltage to the partition wall-side electrode.

24. The display device according to claim 22, wherein the image signal voltage application by the first voltage applying means to the substrate-side electrodes and the voltage application by the second voltage application means to the partition wall-side electrode are performed simultaneously.

25. The display device according to claim 22, wherein:
- the charged colored particles include two or more kinds of particles having different charging characteristics and internally existing in the space; and
- the second voltage applying means applies a voltage to the partition wall-side electrode, the voltage forming an electric field for preventing adherence to the partition wall of particles whose color is observed among the charged colored particles from a viewing side and determines a display color.

26. The display device according to claim 22, wherein the first voltage applying means and the second voltage applying means are configured including a common power supply.

27. The display device according to claim 22, wherein the first voltage applying means and the second voltage applying means are configured including different power supplies respectively.

28. The display device according to claim 22, wherein the partition wall-side electrode is electrically connected to at least one of the substrate-side electrodes.

29. The display device according to claim 28, wherein:
- the first voltage applying means applies the image signal voltage to a first electrode and a second electrode, which are the pair of electrodes disposed on the substrates, to form an electric field directed toward the second electrode;
- the second voltage applying means applies a voltage to the partition wall-side electrode electrically connected to the first electrode to form an electric field directed toward the second electrode; and
- while the voltage is being applied to the second electrode, the voltage is applied to the partition wall-side electrode.

30. The display device according to claim 19, comprising:
- one kind of charged colored particles internally exist in the space;
- a colored layer exhibiting a different color from that of the particles and provided on the side of the substrate-side electrodes or the partition wall-side electrode; and
- a voltage applying means provided for applying the image signal voltage between the substrate-side electrode and the partition wall-side electrode.

31. The display device according to claim 30, wherein:
- a display operation in each of the pixels in the display device includes at least a first display state and a second display state;
- in the first display state, the charged particles covers the surface of the colored layer provided on the side of the substrate-side electrode; and
- in the second display state, the charged particles travel to the partition wall-side electrode to expose the surface of the colored layer.

32. The display device according to claim 19, wherein at least one of a voltage applied to the partition wall-side electrode and a voltage applied to the substrate-side electrode is configured by superimposing a DC voltage and a rectangular wave AC voltage smaller than the DC voltage.

33. The display device according to claim 19, wherein the partition wall also serves as the partition wall-side electrode.

34. The display device according to claim 19, wherein the partition wall partitions the pixels into a hexagonal shape when viewed in plan.

35. The display device according to claim 1 or 19, wherein at least one kind of the charged colored particles are porous particles.

36. The display device according to claim 1 or 19, wherein at least one kind of the particles is composed of particles composed of core particles and micro-particles having a diameter of from about $1/1000$ to about $1/100$ of the diameter of the core particles and fixed to the core particles in a manner to cover the surface of the core particles.

37. The display device according to claim 1 or 19, wherein the surfaces of the particles, or at least a portion of the surface of a member on which the particles adhere are subjected to a water-repelling treatment.

38. A method of manufacturing a display device, including a pair of substrates opposed to each other and provided with electrodes, at least one of the substrates is light-transmissive and at least one of the electrode is formed on at least one surface of the substrates, a spacer formed between the substrates for retaining a space having a desired width, at least one kind of group of electrostatic particles contained in the space between the substrates, and a vibration generating portion provided so as to face the space in which the group of particles travel and configured generate a mechanical vibration using at least a vibration material interposed between the electrode and one of the substrates having that electrode, the device being configured to display an image corresponding to an image signal voltage applied to the electrodes by causing the group of particles to travel in the space between the substrate by an electric field produced by the image signal voltage, the method comprising:

a step to contain the group of particles in the space between the substrates; and a step to generate vibration by the vibration-generating portion after the particles containing step.

39. A method of manufacturing a display device, including a partition wall for partitioning into pixels a space formed between a pair of opposed substrates, at least one of which is transparent, substrate-side electrode connected to a voltage applying means and provided on an inner surface of at least one of the substrates for each of the pixels, and a partition wall-side electrode provided on the partition wall for each of the pixels and connected to the voltage applying means, the device being configured to display an image corresponding to an image signal voltage by causing at least one kind of plural charged colored particles internally existing in the space to travel in the space by an electric field produced by the image signal voltage applied to at least the substrate-side electrode, the method comprising:

a step to contain at least one kind of plural charged colored particles in the space; and a step to apply an AC voltage to at least the substrate-side electrodes to generate an alternating electric field in the space after the particles containing step.

* * * * *